US011216415B2

(12) United States Patent
Magazine et al.

(10) Patent No.: US 11,216,415 B2
(45) Date of Patent: Jan. 4, 2022

(54) IDENTIFICATION AND RECOMMENDATION OF FILE CONTENT SEGMENTS

(71) Applicant: Citrix Systems, Inc., Fort Lauderdale, FL (US)

(72) Inventors: Anuj Magazine, Bangalore (IN); Praveen Raja Dhanabalan, Bangalore (IN); Anudeep Narasimhaprasad Athlur, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 308 days.

(21) Appl. No.: 16/446,112

(22) Filed: Jun. 19, 2019

(65) Prior Publication Data
US 2020/0401555 A1 Dec. 24, 2020

(51) Int. Cl.
*G06F 16/10* (2019.01)
*G06F 16/11* (2019.01)
*G06F 16/178* (2019.01)
*G06K 9/00* (2006.01)
*G10L 15/26* (2006.01)

(52) U.S. Cl.
CPC .......... *G06F 16/122* (2019.01); *G06F 16/178* (2019.01); *G06K 9/00765* (2013.01); *G10L 15/26* (2013.01)

(58) Field of Classification Search
None
See application file for complete search history.

(56) References Cited

U.S. PATENT DOCUMENTS

| 6,557,042 B1* | 4/2003 | He | G06Q 30/02 709/231 |
|---|---|---|---|
| 8,843,951 B1* | 9/2014 | Sherrets | H04H 60/43 725/14 |
| 9,678,637 B1 | 6/2017 | Brothers et al. | |
| 2007/0154168 A1* | 7/2007 | Cordray | H04N 5/76 386/230 |
| 2013/0325869 A1* | 12/2013 | Reiley | G06F 16/41 707/741 |
| 2016/0381419 A1* | 12/2016 | Zhang | H04N 21/4223 725/14 |
| 2017/0329762 A1* | 11/2017 | Lintz | H04N 21/2747 |

OTHER PUBLICATIONS

Extended European Search Report dated Jul. 20, 2020 for European Patent Application No. 20175645.9.

* cited by examiner

*Primary Examiner* — Belix M Ortiz Ditren
(74) *Attorney, Agent, or Firm* — Pierce Atwood LLP

(57) ABSTRACT

One disclosed method involves determining at least first and second segments of content represented by a first file, determining first data corresponding to occasions on which the first segment has been previously accessed, and determining second data corresponding to occasions on which the second segment has been previously accessed. Based at least in part on the first data and the second data, the first segment may be determined to be more likely relevant to a first user than the second segment.

22 Claims, 18 Drawing Sheets

| | | File XYZ | | | | |
|---|---|---|---|---|---|---|
| | | First Segment | | | Second Segment | |
| Location | Job Title | # of Accesses | Duration | Tag A | # of Accesses | Duration | Tag A |
| US | Engineer | 201 | 65 mins. | 3 | 33 | 15 mins. | 0 |
| India | Engineer | 21 | 3 mins. | 0 | 4 | 2 mins. | 0 |
| US | Sales | 36 | 16 mins | 1 | 91 | 35 mins | 4 |
| Canada | Marketing | 88 | 22 | 1 | 66 | 29 | 6 |

FIG. 8

- North America
  - United States
  - Canada
  - Mexico
- South America
- Europe
- Asia
- Africa
- Australia

- Engineer
  - Electrical Engineer
  - Software Engineer
  - Mechanical Engineer
- Sales
- Marketing
- Human Resources
- Management

FIG. 10

IDENTIFICATION AND RECOMMENDATION OF FILE CONTENT SEGMENTS

BACKGROUND

Various file sharing systems have been developed that allow users to store and/or retrieve files or other data to and/or from a repository. ShareFile®, offered by Citrix Systems, Inc., of Fort Lauderdale, Fla., is one example of a system that provides such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, at least one computing device performs a method involving determining at least first and second segments of content represented by a first file, determining first data corresponding to occasions on which the first segment has been previously accessed, and determining second data corresponding to occasions on which the second segment has been previously accessed. Based at least in part on the first data and the second data, it is determined that the first segment is likely more relevant to a first user than the second segment.

In other disclosed embodiments, a system includes at least one processor and at least one computer-readable medium. The at least one computer-readable medium is encoded with instructions which, when executed by the at least one processor, cause the system to determine at least first and second segments of content represented by a first file, to determine first data corresponding to occasions on which the first segment has been previously accessed, to determine second data corresponding to occasions on which the second segment has been previously accessed, and to determine, based at least in part on the first data and the second data, that the first segment is likely more relevant to a first user than the second segment.

In still other disclosed embodiments, at least one computing device performs a method involving decoding at least one first payload of a first media file to determine at least first un-encoded data representing audio, and determining first text corresponding to at least a portion of the audio. At least first and second segments of media content represented by the first media file are determined based at least in part on the first text, and a second media file that includes at least one second payload that represents the first segment but not the second segment is generated.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 8 shows examples of segment access data and tags that may be stored in one or more tables of the database shown in FIG. 4;

FIG. 10 shows an example of user interface for allowing a user to select one or more items in an expandable tree structure for use in a segment relevance determination;

DETAILED DESCRIPTION

For purposes of reading the description of the various embodiments below, the following descriptions of the sections of the specification and their respective contents may be helpful:

Section A provides an introduction to example embodiments of a file segment management system (FSMS) configured in accordance with the present disclosure;

Section B describes a network environment and computing environment which may be useful for practicing embodiments described herein;

Section C describes embodiments of systems and methods for enabling file sharing over one or more networks;

Section D provides a detailed description of example embodiments of a file segment management system (FSMS) configured in accordance with the present disclosure; and Section E describes example implementations of methods, systems, and computer-readable media in accordance with the present disclosure.

A. Introduction to Illustrative Embodiments of a File Segment Management System (FSMS)

Figure 1A:
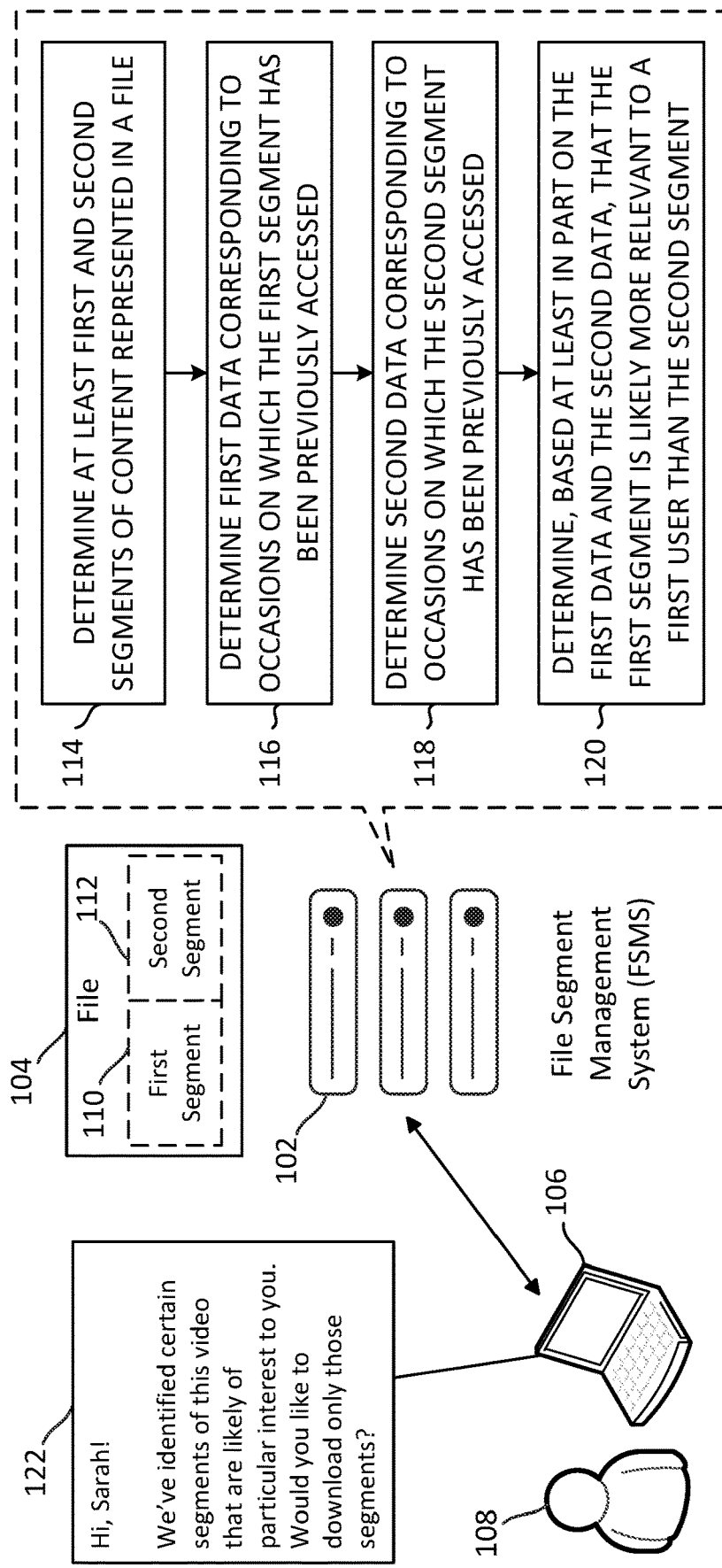
FIG. 1A is a diagram illustrating certain features of an embodiment of a file segment management system (FSMS) configured in accordance with the present disclosure.
Figure 1B:
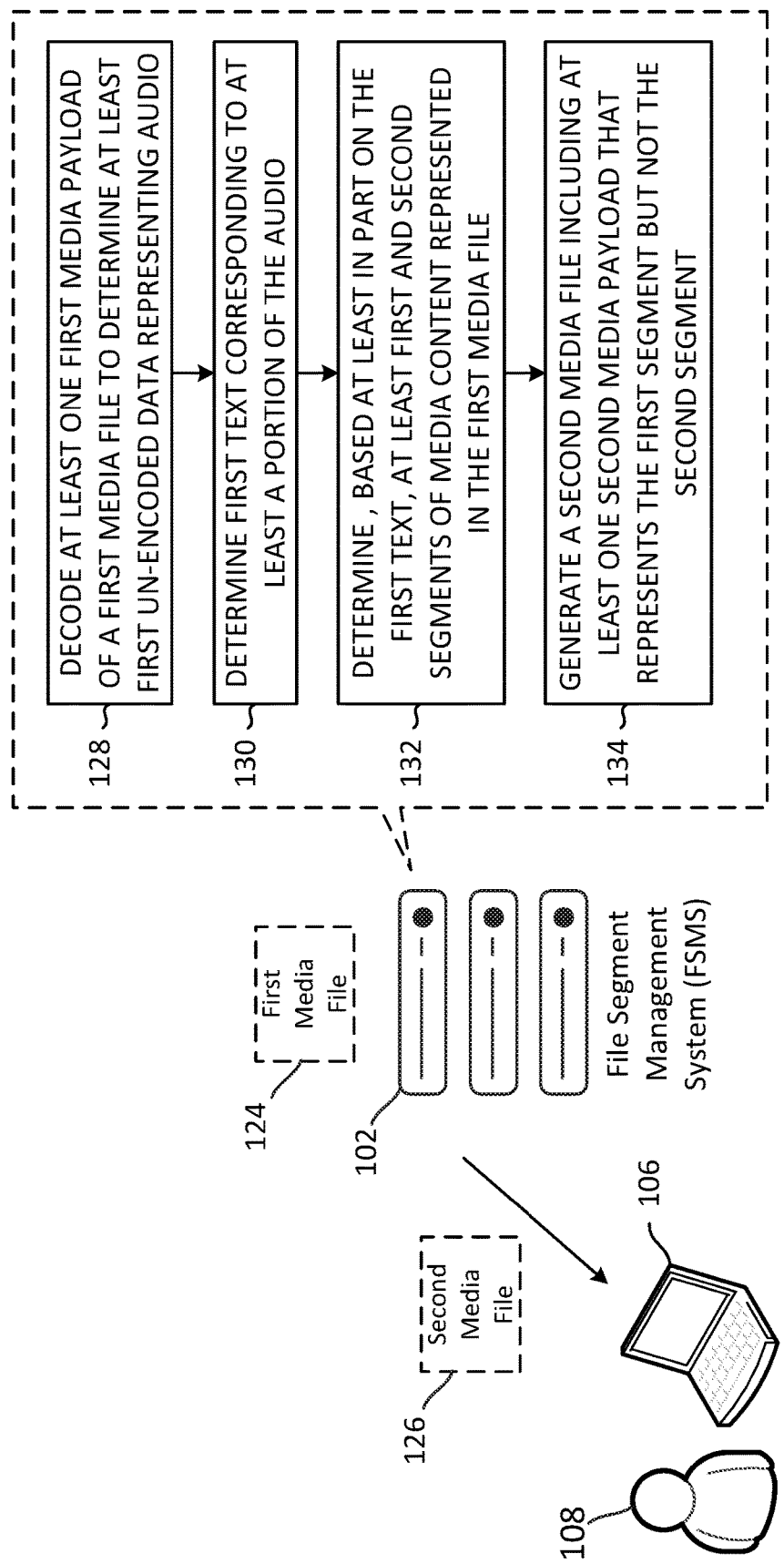
FIG. 1B is a diagram illustrating certain features of another embodiment of a file segment management system (FSMS) configured in accordance with the present disclosure.
Figure 1C:
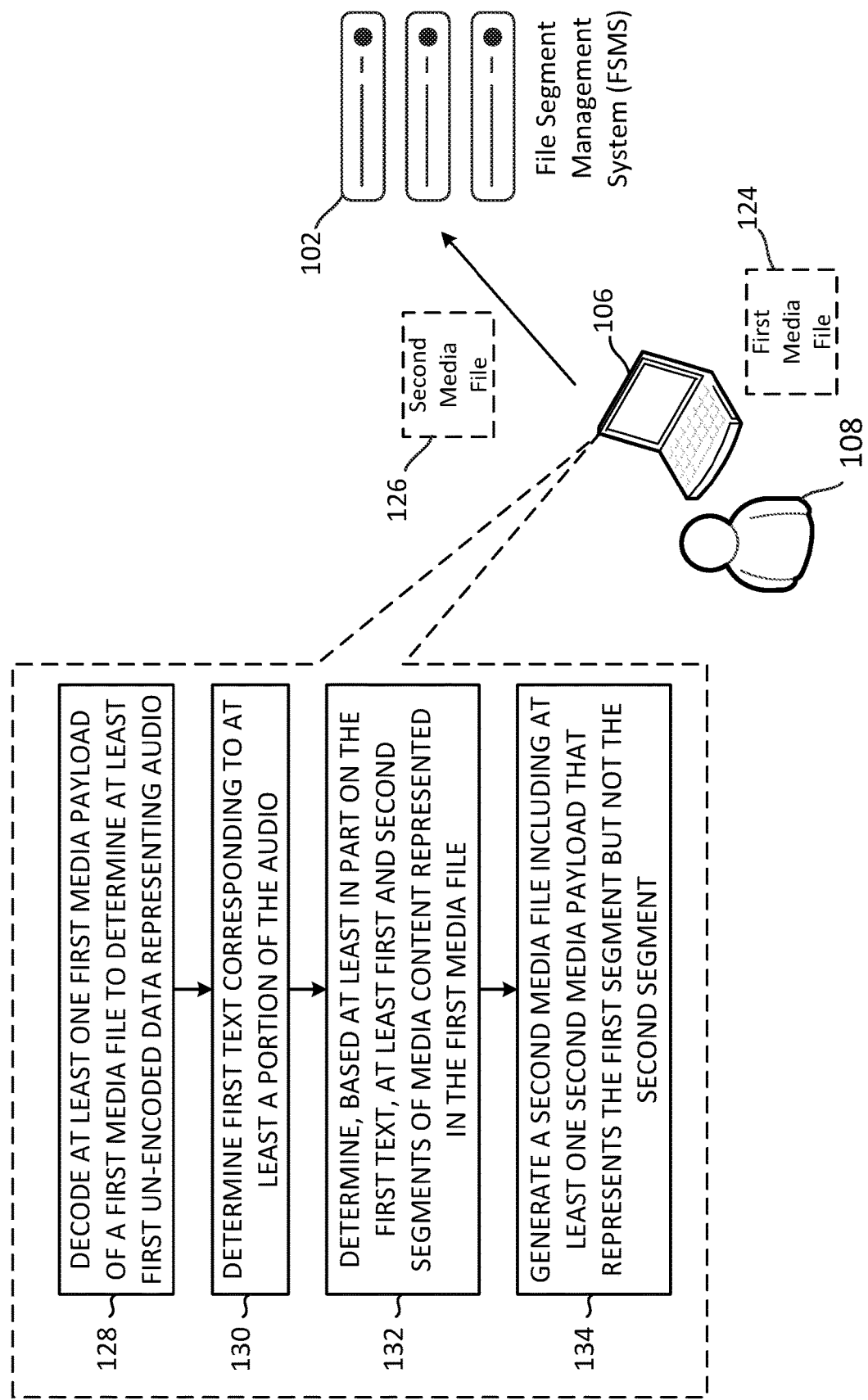
FIG. 1C is a diagram illustrating certain features of yet another embodiment of a file segment management system (FSMS) configured in accordance with the present disclosure.

FIGS. 1A-C show example embodiments of a file segment management system (FSMS) 102 that may be used to implement various aspects of the present disclosure. Although the illustrated examples show the FSMS 102 as including just three servers, it should be appreciated that the FSMS 102 may include any number of servers (including only a single server) as well as any number of additional or different components, such as one or more databases, other network components, etc. The inventors have recognized and appreciated that that some users may not want or require significant portions of some files. For example, for large video files available to a large population of a business enterprise, engineers may be primarily interested in certain segments of the video relating to technical topics whereas sales personnel may be primarily interested in other segments of the video relating to market analysis and pricing. In view of this, in some embodiments, the FSMS 102 may advantageously allow discrete portions of a file 104 to be readily identified and transferred between a client device 106 operated by a user 108 and a file repository, e.g., a file sharing system included within or associated with the FSMS 102, thus minimizing the bandwidth required to transfer relevant content between the client device 106 and the repository. Although the described embodiments may be particularly useful for managing the transfer of very large media files, such as video files (e.g., MP4s), they may also be applicable to smaller files that represent other content which can be visually and/or audibly presented for human consumption, such as audio files (e.g., MP3s), desktop publishing files (e.g., PDFs), etc.

FIG. 1A illustrates an example embodiment of the FSMS 102 in which one or more segments of content represented by the file 104 that are most likely to be relevant to the user 108 may be identified by evaluating how often and/or extensively the various content segments of the file 104, e.g., segments 110 and 112 shown in FIG. 1A, have been previously accessed. As shown, the FSMS 102 may, at a step 114, determine at least the first segment 110 and the second segment 114 of content represented in the file 104. In some embodiments, for example, the first and second segments may correspond to respective portions of a video represented by an MP4 file of the like. Although not illustrated, the video (or other content) may also include many more segments in addition to the first segment 110 and the second segment 112 referenced in FIG. 1A. The respective segments of content may have been identified in any of numerous ways prior to the step 114. In some embodiments, for example, the segments 110, 112 may, at least in part, have been identified automatically by analysis of a transcript of audio represented in the file 104. In other embodiments, the segments 110, 112 may have been identified by an author or designated custodian of the file 104. In yet other embodiments, the segments 110, 112 may have been identified based on "tags" applied to portions of the content by one or more individuals while they were previously accessing the file 104. Each of these processes for identifying respective content segments in files is described in more detail below. In any event, at the step 114, the FSMS 102 may determine at least two such segments of the content represented in the file 104 for further analysis.

At steps 116 and 118, the FSMS 102 may determine data corresponding to occasions on which each of the first and second segments 110, 112, and perhaps other segments as well, have been previously accessed, e.g., viewed or listened to, by one or more individuals. The FSMS 102 may, for example, consult a database (not shown in FIG. 1A) that includes records indicating the frequency and/or extent to which various individuals have accessed the different segments of the content. Examples of techniques for collecting such historical access data are described in more detail below. In some embodiments, the database may additionally correlate the historical access data with one or more characteristics of the individuals who accessed the respective segments, such as the location of the individuals at the time of access and/or demographic information about the individuals, such as their job titles, age, sex, nationality, languages spoken, etc.

At a step 120, the FSMS 102 may determine, based at least in part on the historical access data, one or more segments of the content that are likely to be of the most interest to the user 108. In some embodiments, the segment(s) that have been accessed (e.g., viewed or listened to) most often and/or extensively by other individuals, regardless of their locations and/or demographics, may be determined to be likely more relevant to the user 108 than the other segments. The segment(s) so identified may thus be considered the most "popular" segment(s) for the overall population of individuals who have accessed at least a portion of the file 104. In other embodiments, the current location and/or demographic data of the user 108 may be determined, and the segment(s) that have been viewed most often and/or extensively by other individuals similarly situated with the user 108, e.g., who accessed such segment(s) at the same location and/or who share common demographic data with the user 108, may be identified to determine which segment(s) are likely more relevant to the first user 108 than the other segments. The segment(s) identified using the latter technique may be considered the most popular segment(s) for a subset of all individuals who have previously accessed at least a portion of the file 104 and who also share one or more characteristics with the user 108.

As shown in FIG. 1A, in some embodiments, the client device 106 may present the user 108 with a message 122 informing the user 108 that certain segments of the content (e.g., video segments) represented in the file 104 have been determined to likely be of particular interest to the user 108 and giving the user 108 the option to download only the identified segments to the client device 106. The message 122 may, for example, have been generated by the FSMS 102 and sent to the client device 106 in response to the client device 106 (under control of the user 108) having sent a request to the FSMS 102 to download the entirety of the file 104. Although not shown in FIG. 1A, in some embodiments, the message 122 presented to the user 108 may also inform the user 108 of the basis of the relevance determination, e.g., by indicating that the determination is based on the current location of the user 108, the job title, e.g., engineer, sales representative, marketing representative, of the user 108, etc. Further, as explained in more detail below, in some embodiments, the client device 106 may additionally present the user 108 with a user-interface that allows the user 108 to adjust the criteria on which the relevance determination is based, such as by allowing the user to specify whether the relevance determination is to be based on one or more of location, job title, etc., or by allowing the user to change the particular parameters that are to be used in making such a determination.

In other embodiments, the relevance determination of the step 120 may additionally or alternatively be used to determine one or more segments of file content (e.g., video segments) that are to be transferred from the FSMS 102 to the client device 106 during an automated synchronization operation, thus maximizing the likelihood that the client device 106 will have stored on it the segment(s) of the file 104 that are of the most interest to the user 108 following such a synchronization operation.

FIGS. 1B and 1C show steps that may be performed by the FSMS 102 (FIG. 1B) or a client device 106 (FIG. 1C) to process a first media file 124 to generate a second media file 126 that represents less than all of the media content represented by the first media file 124. Because the second media file 126 may be significantly smaller than the first media file 124, the bandwidth required to transfer the second media file 126 may be substantially less than that required to transfer to the first media file 124. Significant network resources can thus be conserved by transferring only one or more discrete portions of the first media file 124 (which are included within the second media file 126) from the FSMS 102 to the client device 106 (as shown in FIG. 1B) or from the client device 106 to the FSMS 102 (as shown in FIG. 1C).

As shown in FIGS. 1B and 1C, at a step 128, a payload of the first media file 124 corresponding to an audio channel may be decoded to determine un-encoded data representing audio. In some embodiments, the first media file 124 may also include a video payload that is synchronized with the audio channel, such as with an MP4 file or the like. In other embodiments, the first media file 124 may contain only audio content, such as with an MP3 file or the like.

At a step 130, the audio represented in the file may be converted to text using automatic speech recognition (ASR) processing on the un-encoded audio data. The resulting text may thus constitute a transcript of at least one channel of the audio represented in the file. At a step 132, the transcript may be analyzed to identify discrete segments of the audio and/or video content represented in the first media file 124. For example, if the first media file 124 represents a multimedia presentation directed to employees of a business enterprise, respective segments of video and audio channel(s) represented in the first media file 124 may, based on a review of the transcript, be determined to correspond to introductory remarks, an agenda for the presentation, technical details of a product, sales metrics for the product, a summary of the discussion, concluding remarks, and so on. In some embodiments, the analysis of the text can be based simply on the presence of one or more keywords that are likely to coincide with particular topics of discussion. In other embodiments, the analysis can be more sophisticated and may, for example, involve processing the text using one or more trained neural networks to identify discrete topics within the transcript.

At a step 134, the second media file 126 may be generated so as to include as one or more payloads representing only certain of the segments determined at the step 132. When the first media file 124 represents multiple channels of audio, the second media file 126 may include not only an audio payload corresponding to selected segment(s) of the transcribed audio channel, but also payloads representing corresponding segments of the other audio channel(s) represented in the first media file 124. Similarly, when the first media file 124 includes a payload representing video in addition to the transcribed audio channel, the second media file 126 may include not only an audio payload corresponding to selected segment(s) of the transcribed audio channel, but also a video payload representing corresponding segments of the video. In some embodiments, for example, timestamps or the like may be used to correlate video and or other audio channels with the text of the transcribed audio channel. To generate the second media file 126, the selected segment(s) of the decoded and transcribed audio channel payload, as well as corresponding segments of other decoded audio and/or video payload(s) of the first media file 124 may be re-encoded and packaged together with a header and other metadata for the desired media container file format. In some embodiments, the first media file 124 and the second media file 126 have the same media container file format, e.g., they may both be MP4 files or the like.

In the example shown in FIG. 1B, the steps 128, 130, 132 and 134 may be performed by the FSMS 102 and the resulting second media file 126 may be sent from the FSMS 102 to the client device 106. As explained in more detail below, the FSMS 102 may further allow the quantity and/or location of the respective content segments to be refined, e.g., in response to user input, and may also additionally track the frequency and/or extent to which the various segments are accessed and send a recommendation to the client device 106 suggesting that only certain segments that appear to be of more relevance to the user 108 be downloaded to conserve network resources. In the example shown in FIG. 1C, the steps 128, 130, 132 and 134 may be performed by the client device 106 and the resulting second media file 126 may be sent from the client device 106 to the FSMS 102.

Additional details and example implementations of embodiments of the present disclosure are set forth below in Section D, following a description of example systems and network environments in which such embodiments may be deployed.

B. Network and Computing Environment

Figure 2A:
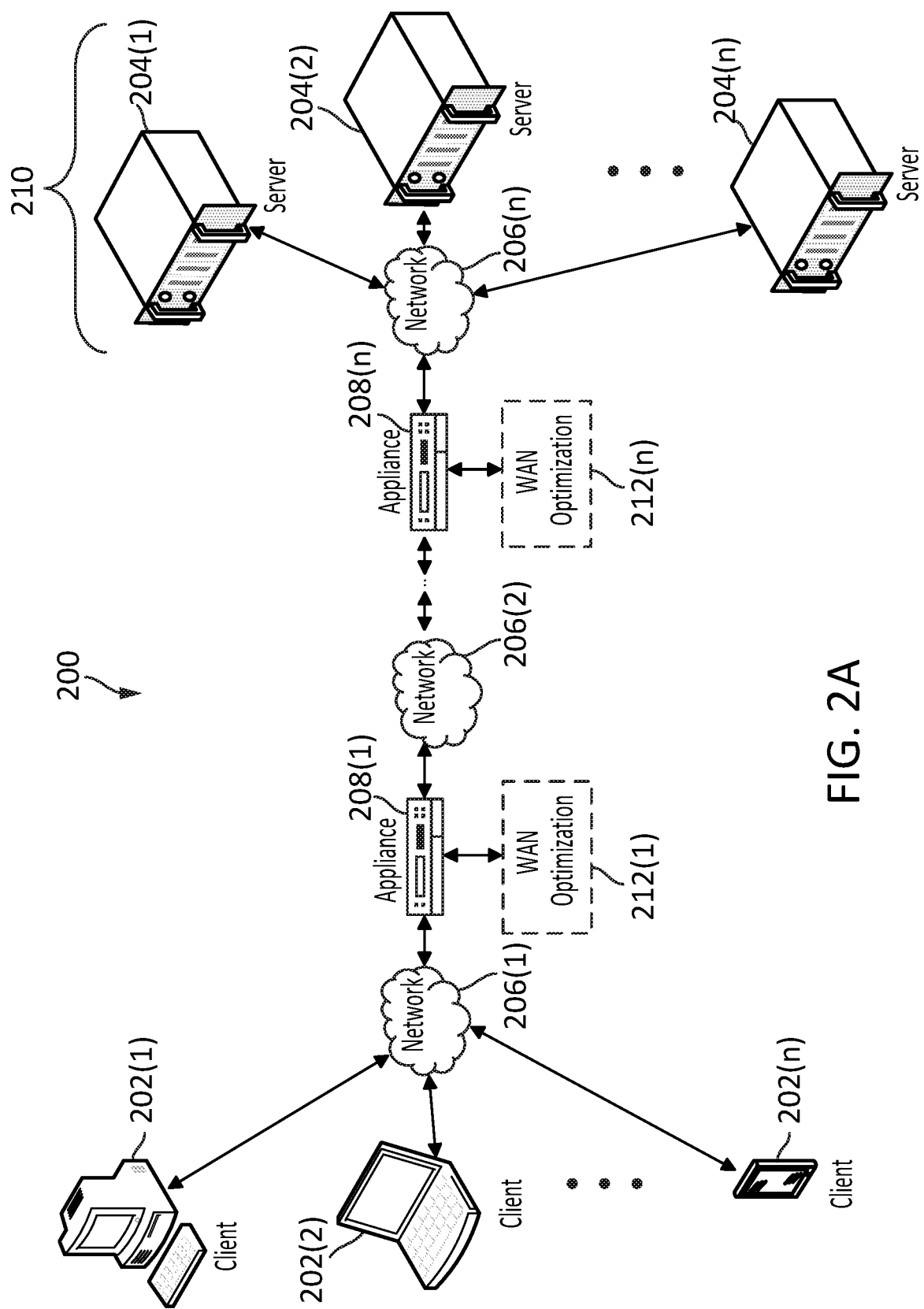
FIG. 2A is a diagram of a network computing environment in which some embodiments of the media file comparison techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another. For example, in some embodiments, one server farm 210 may operate as a file segment management system (FSMS) 102 (as disclosed herein) and another server farm 210 may operate as an application server system (described in more detail below), with one or more servers 204 of the application serving system providing a virtual computing environment to a client 202 and also interacting with the FSMS 102 on behalf of the client 202.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
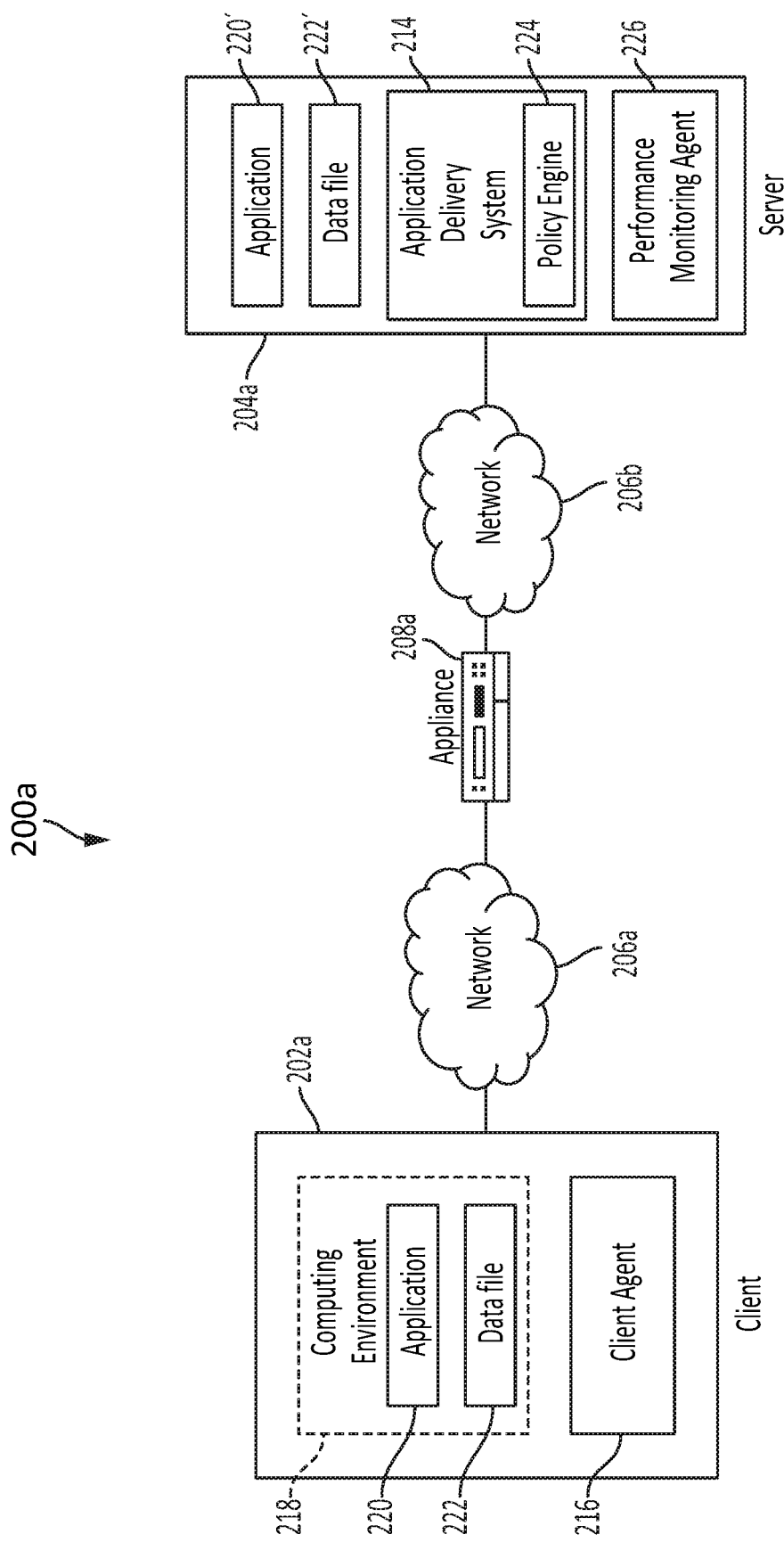
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform end-point detection/scanning and/or collect end-point information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214.

For example, the appliance 208a may accelerate delivery of a streaming application 220' and data file 222' processable by the application 220 from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on client the 202a, or via a remote-display protocol or otherwise via remote-based or server-based computing. In an embodiment, application delivery system 214 may be implemented as any portion of the Citrix Workspace™ by Citrix Systems, Inc., of Fort Lauderdale, Fla., such as Citrix Virtual Apps and Desktops™.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable client the 202a to execute the application 220 locally after receiving the application from the server 204a, or may stream the application via one or more networks 206a, 206b to the client 202a. For example, in some embodiments, the application 220 may be a server-based or a remote-based application executed on the server 204a on behalf of the client 202a. The server 204a may display output to the client 202a using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

Figure 2C:
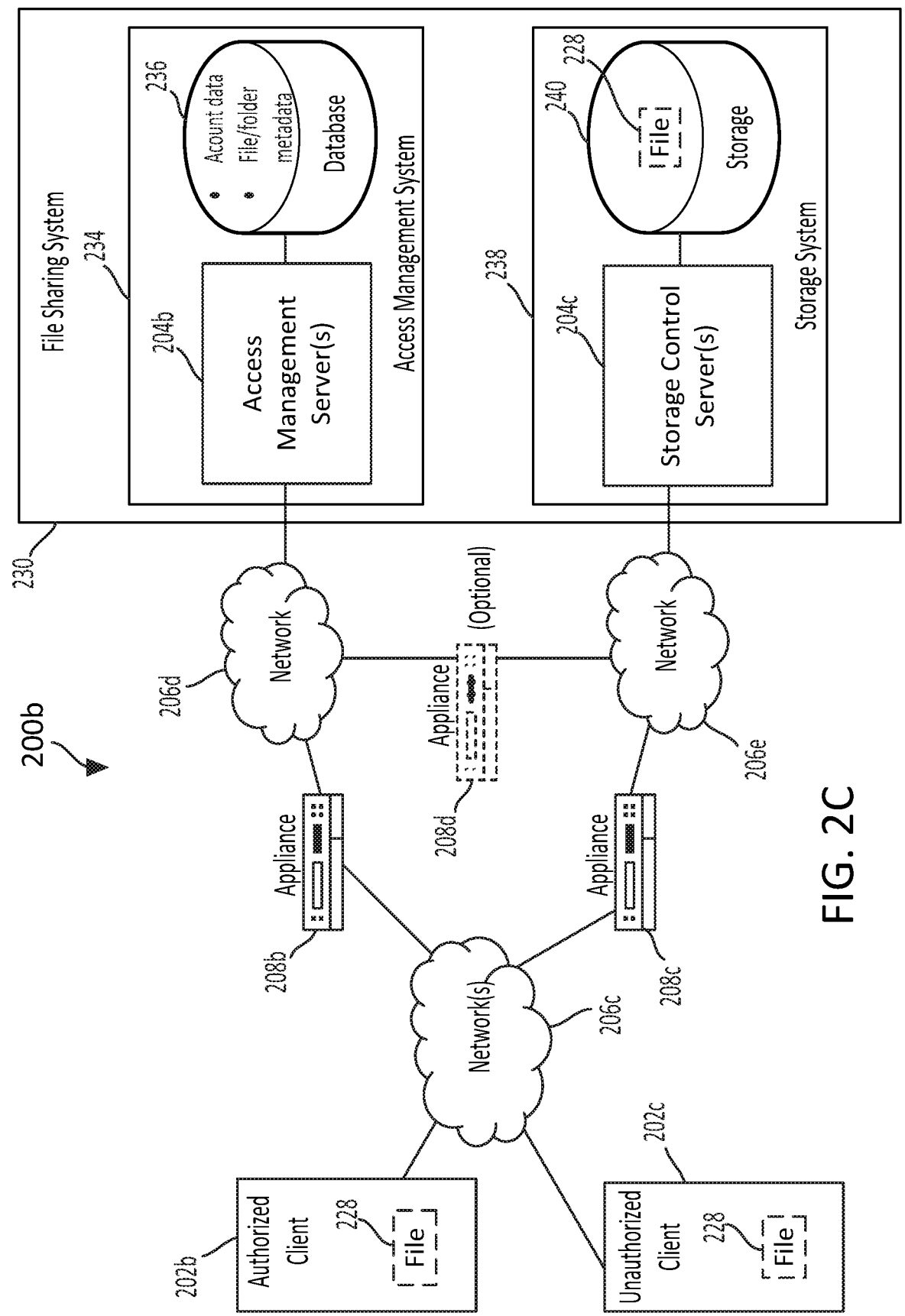
FIG. 2C is a diagram illustrating how a network computing environment like that shown in FIG. 2A may be configured to allow clients to access an example embodiment of a server-based file sharing system.

FIG. 2C shows an example network environment 200b for allowing an authorized client 202b and/or an unauthorized client 202c to upload a file 228 to a file sharing system 230 or download a file 228 from the file sharing system 230. The authorized client 202b may, for example, be a client 202 operated by a user having an active account with the file sharing system 230, while the unauthorized client 202c may be operated by a user who lacks such an account.

As FIG. 2C illustrates, in some embodiments, the file sharing system 230 may include an access management system 234 and a storage system 238. As shown, the access management system 234 may include one or more access management servers 204b and a database 236, and the storage system 238 may include one or more storage control servers 204c and a storage medium 240. In some embodiments, the access management server(s) 204b may, for example, allow a user of the client 202b to log in to his or her account, e.g., by entering a user name and password corresponding to account data stored in the database 236.

Once the user of the client 202b has logged in, the access management server 204b may enable the user to view (via the authorized client 202b) information identifying various folders represented in the storage medium 240, which is managed by the storage control server(s) 204c, as well as any files 228 contained within such folders. File/folder metadata stored in the database 236 may be used to identify the files 228 and folders in the storage medium 240 to which a particular user has been provided access rights.

In some embodiments, the clients 202b, 202c may be connected to one or more networks 206c (which may include the Internet), the access management server(s) 204b may include webservers, and an appliance 208b may load balance requests from the authorized client 202b to such webservers. The database 236 associated with the access management server(s) 204b may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202b, 202c are shown is FIG. 2C as stand-alone computers, it should be appreciated that one or both of the clients 202b, 202c shown in FIG. 2C may instead represent other types of computing devices or systems that can be operated by users. In some embodiments, for example, one or both of the authorized client 202b and the unauthorized client 202c may be implemented as a server-based virtual computing environment that can be remotely accessed using a separate computing device operated by users, such as described above in connection with FIG. 2B.

In some embodiments, the access management system 234 may be logically separated from the storage system 238, such that files 228 and other data that are transferred between clients 202 and the storage system 238 do not pass through the access management system 234. Similar to the access management server(s) 204b, one or more appliances 208b-d may load-balance requests from the clients 202b, 202c received from the network(s) 206c (which may include the Internet) to the storage control server(s) 204c. In some embodiments, the storage control server(s) 204c and/or the storage medium 240 may be hosted by a cloud-based service provider (e.g., Amazon Web Services or Microsoft Azure). In other embodiments, the storage control server(s) 204c and/or the storage medium 240 may be located at a data center managed by an enterprise of a client 202, or may be distributed among some combination of a cloud-based system and an enterprise system, or elsewhere.

After a user of the authorized client 202b has properly logged in to an access management server 204b, the server 204b may receive a request from the client 202b for access to one of the files 228 or folders to which the logged in user has access rights. The request may either be for the authorized client 202b to itself to obtain access to a file 228 or folder or to provide such access to the unauthorized client 202c. In some embodiments, in response to receiving an access request from an authorized client, the access management server 204b may communicate with the storage control server(s) 204c (e.g., either over the Internet via appliances 208b and 208c or via an appliance 208d positioned between networks 206d and 206e) to obtain a token generated by the storage control server 204c that can subsequently be used to access the identified file 228 or folder.

In some embodiments, the generated token may, for example, be sent to the authorized client 202b, and the authorized client 202b may then send a request for a file 228, including the token, to the storage control server(s) 202c. In other embodiments, the authorized client 202b may send the generated token to the unauthorized client 202c so as to allow the unauthorized client 202c to send a request for the file 228, including the token, to the storage control server(s) 202c. In yet other embodiments, an access management server 204b may, at the direction of the authorized client 202b, send the generated token directly to the unauthorized client 202c so as to allow the unauthorized client 202c to send a request for the file 228, including the token, to the storage control server(s) 202c. In any of the forgoing scenarios, the request sent to the storage control server(s) may, in some embodiments, include a uniform resource locator (URL) that resolves to an internet protocol (IP) address of the storage control server(s) 202c, and the token may be appended to or otherwise accompany the URL. Accordingly, providing access to one or more clients 202 may be accomplished, for example, by causing the authorized client 202b to send a request to the URL address, or by sending an email, text message or other communication including the token-containing URL to the unauthorized client 202c, either directly from the access management server(s) 204b or indirectly from the access management server(s) 204b to the authorized client 202b and then from the authorized client 202b to the unauthorized client 202c. In some embodiments, selecting the URL or a user interface element corresponding to the URL, may cause a request to be sent to the storage control server(s) 204c that either causes a file 228 to be downloaded immediately to the client that sent the request, or may cause the storage control server 204c to return a webpage to the client that includes a link or other user interface element that can be selected to effect the download.

In some embodiments, a generated token can be used in a similar manner to allow either an authorized client 202b or an unauthorized client 202c to upload a file 228 to a folder corresponding to the token. In some embodiments, for example, an "upload" token can be generated as discussed above when an authorized client 202b is logged in and a designated folder is selected for uploading. Such a selection may, for example, cause a request to be sent to the access management server(s) 204b, and a webpage may be returned, along with the generated token, that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In some embodiments, sending a request including such a token to the storage control server(s) 204c (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as computer 246 shown in FIG. 2D.

Figure 2D:
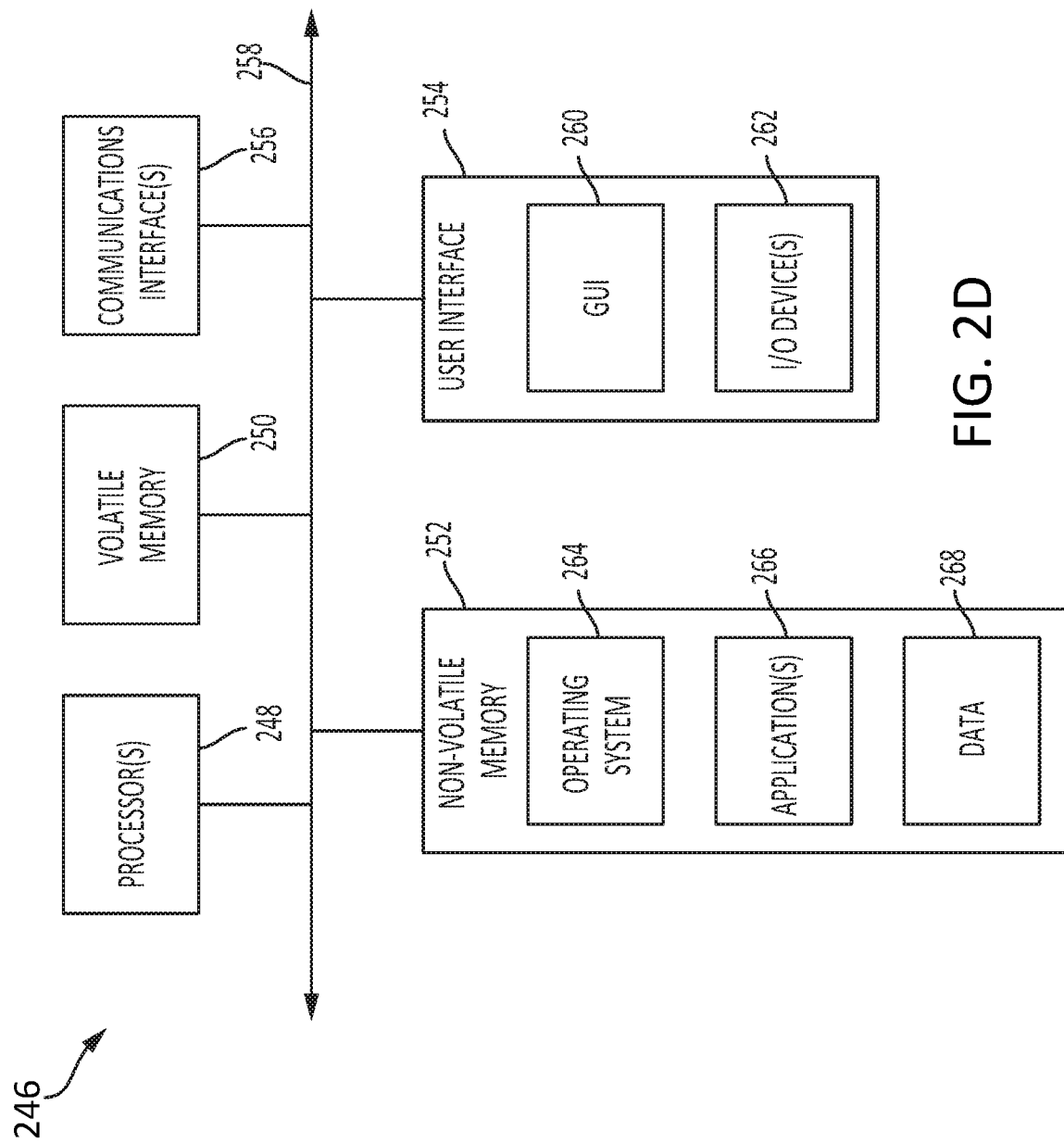
FIG. 2D is a block diagram of a computing device that may be used to implement one or more of the components of the computing environment shown in FIGS. 2A-C.

As shown in FIG. 2D, the computer 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computer 246 may communicate via communication the bus 258. The computer 246 as shown in FIG. 2D is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computer 246 to access a computer network such as a LAN, a WAN, or the Internet through a variety of wired and/or wireless or cellular connections.

As noted above, in some embodiments, one or more computers 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

C. Systems and Methods for Providing File Sharing Over Network(s)

Figure 3A:
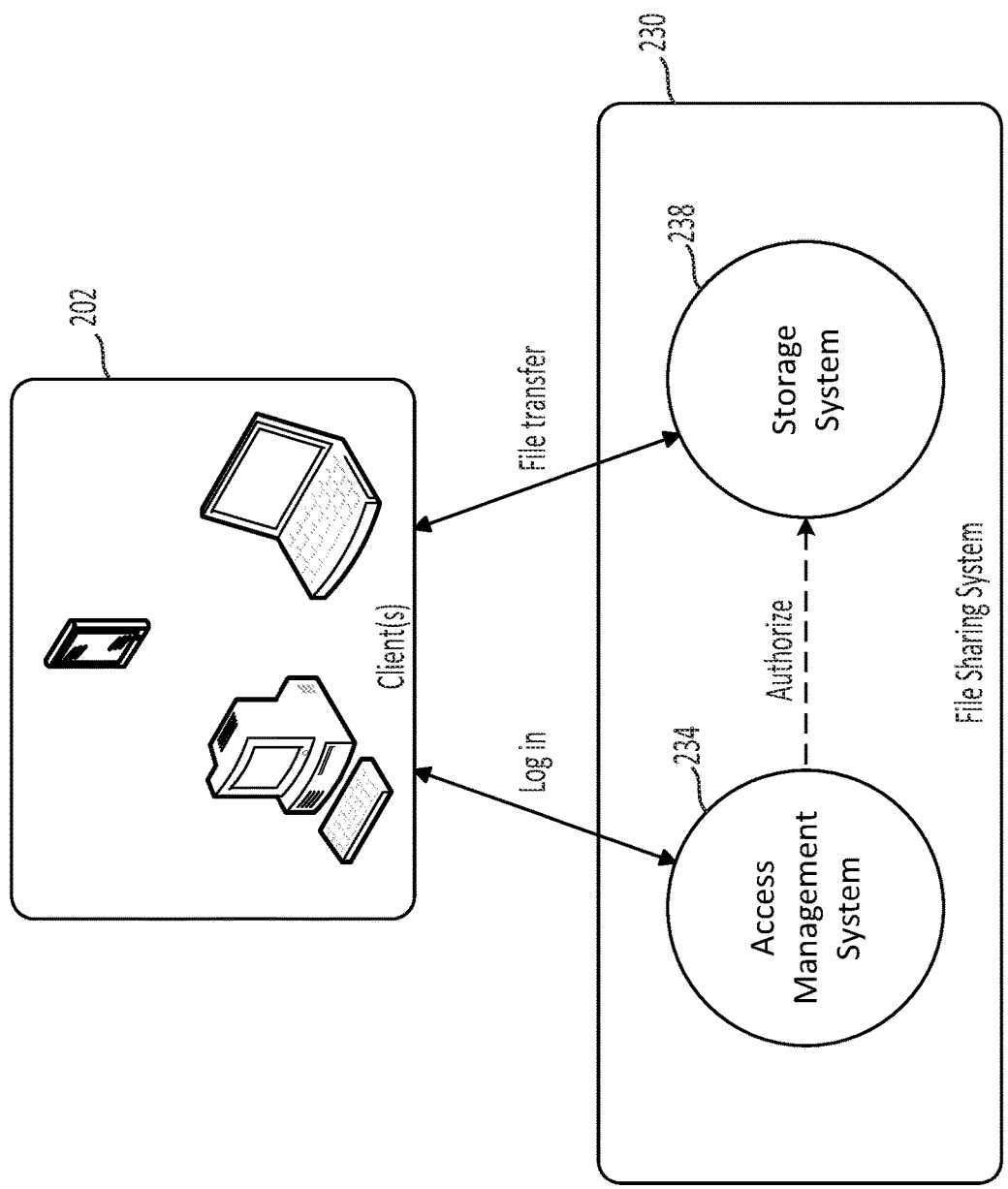
FIG. 3A is a diagram illustrating certain operations that may be performed by the file sharing system shown in FIG. 2C in accordance with some embodiments.

As discussed above in connection with FIG. 2C, in some embodiments, a file sharing system may be distributed between two sub-systems, with one subsystem (e.g., the access management system 234) being responsible for controlling access to files 228 stored in the other subsystem (e.g., the storage system 238). FIG. 3A illustrates conceptually how one or more clients 202 may interact with two such subsystems.

As shown in FIG. 3A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2C) stored by the storage system 238, such as folders maintained by the storage system 238 and any files 228 contained within such folders. In some embodiments, the metadata may also include permission metadata identifying the folders and files 228 each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client

202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2C) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files 228, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 3B:
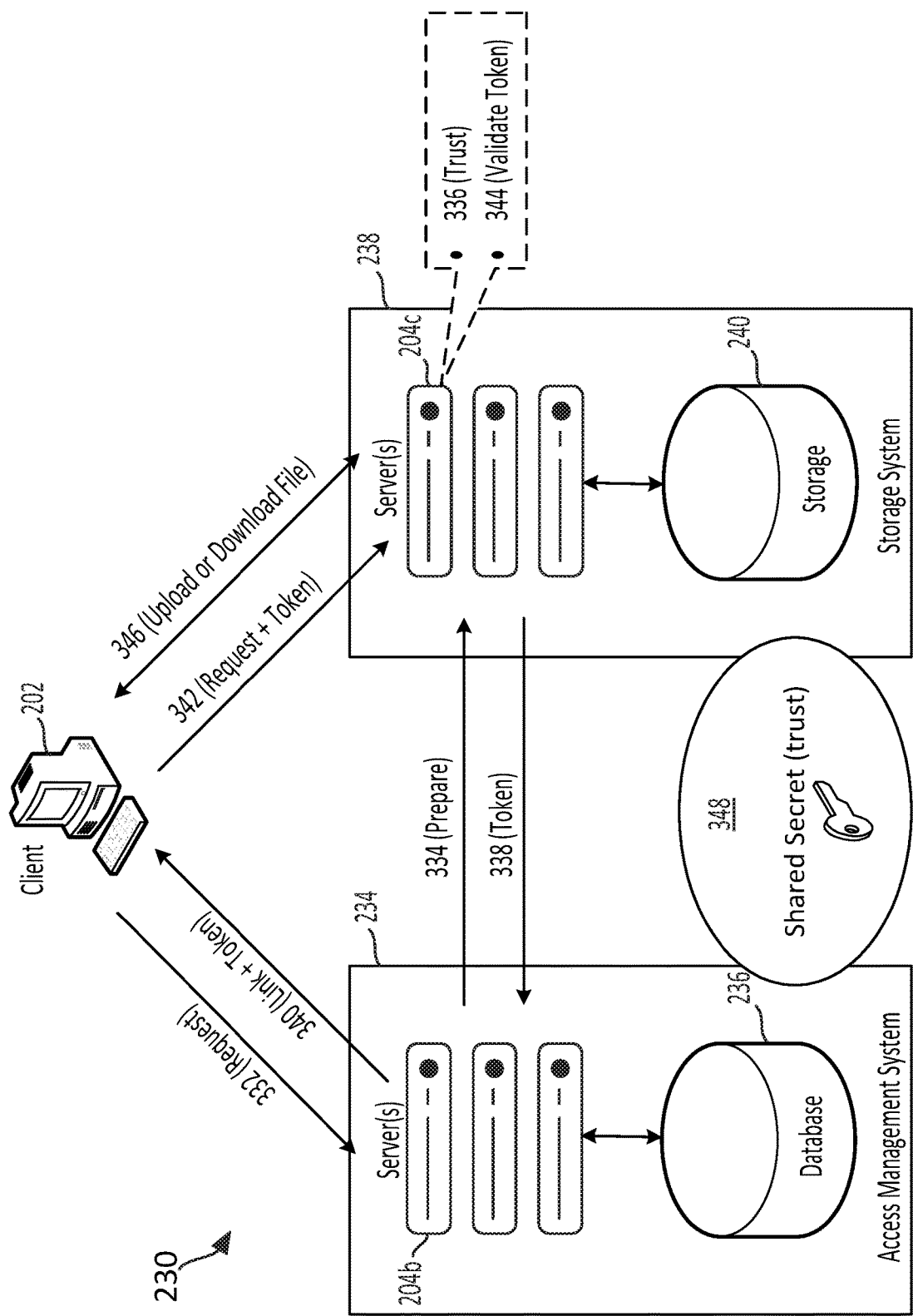
FIG. 3B is a diagram illustrating additional operations that may be performed by the file sharing system shown in FIG. 2C in accordance with some embodiments.

FIG. 3B is a block diagram showing an example of a process for generating access tokens (e.g., the upload tokens and download tokens discussed above) within the file sharing system 230 described in connection with FIGS. 2C and 3A.

As shown, in some embodiments, a logged-in client 202 may initiate the access token generation process by sending an access request 332 to the access management server(s) 204b. As noted above, the access request 332 may, for example, correspond to one or more of (A) a request to enable the downloading of one or more files 228 (shown in FIG. 2C) from the storage system 238 to the logged-in client 202, (B) a request to enable the downloading of one or more files 228 from the storage system 238 to a different client 202 operated by a different user, (C) a request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 332, an access management server 204b may send a "prepare" message 334 to the storage control server(s) 204c of the storage system 238, identifying the type of action indicated in the request, as well as the identity and/or location within the storage medium 240 of any applicable folders and/or files 228. As shown, in some embodiments, a trust relationship may be established (step 336) between the storage control server(s)

204c and the access management server(s) 204b. In some embodiments, for example, the storage control server(s) 204c may establish the trust relationship by validating a hash-based message authentication code (HMAC) based on shared secret or key 348).

After the trust relationship has been established, the storage control server(s) 204c may generate and send (step 338) to the access management server(s) 204b a unique upload token and/or a unique download token, such as those as discussed above.

After the access management server(s) 204b receive a token from the storage control server(s) 204c, the access management server(s) 204b may prepare and send a link 340 including the token to one or more client(s) 202. In some embodiments, for example, the link may contain a fully qualified domain name (FQDN) of the storage control server(s) 204c, together with the token. As discussed above, the link 340 may be sent to the logged-in client 202 and/or to a different client 202 operated by a different user, depending on the operation that was indicated by the request.

The client(s) 202 that receive the token may thereafter send a request 342 (which includes the token) to the storage control server(s) 204c. In response to receiving the request, the storage control server(s) 204c may validate (step 344) the token and, if the validation is successful, the storage control server(s) 204c may interact with the client(s) 202 to effect the transfer (step 346) of the pertinent file(s) 228, as discussed above.

D. Detailed Description of Example Embodiments of a File Segment Management System (FSMS)

Figure 4:
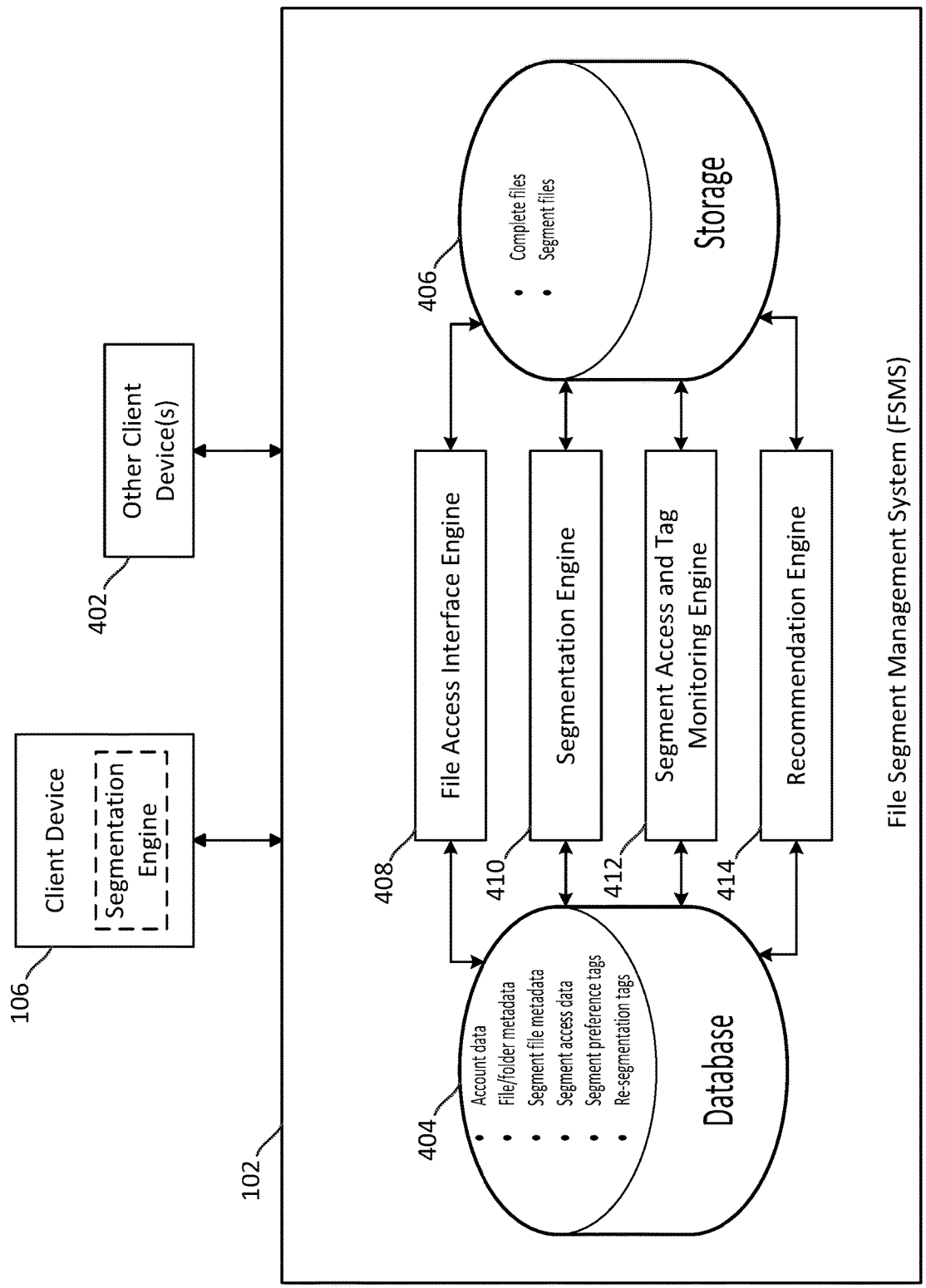
FIG. 4 shows an example embodiment of a file segment management system (FSMS) configured in accordance with the present disclosure.

An example embodiments of the FSMS 102, as introduced above in connection with FIGS. 1A-C, is shown in FIG. 4. As shown, the FSMS 102 may interact with the client device 106 (also shown in FIGS. 1A-C) as well as any number of other client devices 402. In some embodiments, each of the client devices 106, 402 may correspond to one of the clients 202, and the FSMS 102 may correspond to one or more of the servers 204, or one or more servers that operate in conjunction with one or more of the servers 204, that are described above in connection with FIGS. 2 and 3. In some implementations, for example, the FSMS 102 may be implemented within or in conjunction with a file sharing system, such as the file sharing system 230 described above in connection with FIGS. 2C, 3A, and 3B.

As shown in FIG. 4, the FSMS 102 may include a database 404 and a storage medium 406, as well as four functional engines in communication therewith: a file access interface engine 408, a segmentation engine 410, a segment access and tag monitoring engine 412, and a recommendation engine 414. Each of the engines 408, 410, 412, and 414 may, for example, be implemented as one or more processors that execute instructions encoded on one or more computer-readable media. In some embodiments, the file access interface engine 408 may implement functionality that is the same as or similar to that implemented by the access management server(s) 204b and the storage control server(s) 204c described above, as well as additional functionality relating to the processing of file download requests received from clients 202, as described below in connection with FIG. 5, or other functionality described herein. In such implementations, the database 404 and the storage medium 406 may either be the same as the database 236 and the storage medium 238, or wholly or partially separate from the database 236 and the storage medium 238. The functionality of the engines 408, 410, 412, and 414 described herein may, in some embodiments, be implemented by one or more of the access management server(s) 204b, the storage control server(s) 204c, or one or more servers that operate in conjunction with the access management server(s) 204b and/or the storage control server(s) 204c. Alternatively, the FSMS 102 may be implemented using a different file sharing or file management architecture.

As shown in FIG. 4, the storage medium 406 may store both "complete files" and "segment files." The segment files may, for example, each represent one or more, but fewer than all, segments of content that is represented by one of the complete files. In embodiments in which the FSMS 102 is implemented as a part of or conjunction with the file sharing system 230, the complete files may correspond to the files 228 described above in connection with FIGS. 2C, 3A, and 3B. As also shown in FIG. 4, the database 404 may store "account data," "file/folder metadata," "segment access data," "segment preference tags," and "re-segmentation tags." In some embodiments, the account data and file/folder metadata may be the same or similar to, and may serve the same or a similar purpose as, the account data and file/folder metadata employed by the file sharing system 230 described above in connection with FIGS. 2C, 3A, and 3B. The file/folder metadata may thus identify and describe the various complete files that are stored in the storage medium 406. In a similar fashion, the segment file metadata may identify and describe the various segment files store in the storage medium 406, as described in more detail below. As also described in more detail below, the segment access data, segment preference tags, and re-segmentation tags may be managed by the segment access and tag monitoring engine 412 based on interactions by client devices 106, 402 with the file access interface engine 408. Further, as explained below, the segment access data and segment preference tags may be used by the recommendation engine 414 to recommend particular segment files to a user of the client device 106, and the re-segmentation tags may be used by the segmentation engine 410 to determine whether and how to identify new or different segments of content for the complete files stored in the storage medium 406.

Figure 5:
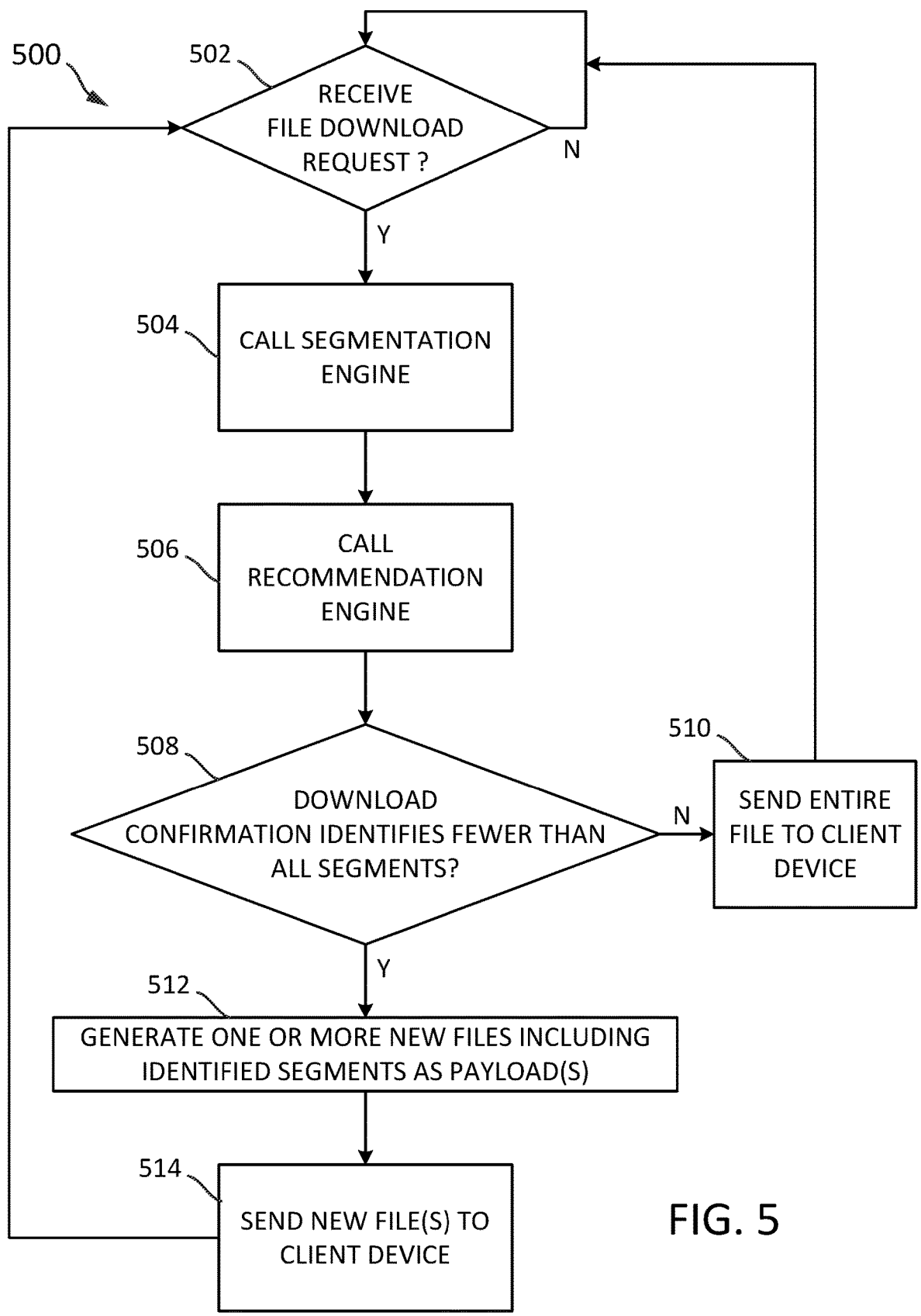
FIG. 5 shows an example routine that may be executed by the file access interface engine shown in FIG. 4.

FIG. 5 shows an example of a routine 500 that may be performed by the file access interface engine 408 when the FSMS 102 receives a request to download an entire file stored in the storage medium 406, as indicated by the file/folder metadata stored in the database 404. As shown, at a step 502, the routine 500 may determine that a download request for an entire file has been received from the client device 106. Alternatively, the step 502 may correspond to a user somehow identifying a file for potential download. For instance, a user of the client device 106 may navigate to a folder including files stored by the storage medium 406 and then click on or mouse over a file name or user interface element corresponding to an entire file.

At a step 504, the routine 500 may make a call to the segmentation engine 410 to determine whether and/or how the content represented by the entire file is to be segmented (if it has not already been segmented) or re-segmented, as explained below. An example of a routine 600 that may be executed by the segmentation engine 410 for such purposes is described below in connection with FIG. 6. As explained in more detail below, in some embodiments, some or all of the functions performed by the segmentation engine 410 may additionally or alternatively be performed at different times and/or under different circumstances. For example, in some embodiments, the content represented by files may instead be initially segmented each time a new file is uploaded to the FSMS 102 and/or may be conditionally re-segmented each time a new re-segmentation tag is received, and/or the content represented by some or all of the files stored by the storage medium 406 may be segmented and/or re-segmented periodically. Other implementations are also possible and contemplated.

At a step 506, the routine 500 may make a function call to the recommendation engine 414. An example of a routine 900 that may be performed by the recommendation engine 414 is described below in connection with FIGS. 9A-B. As described in more detail below, the recommendation engine 414 may, in some embodiments, send a message to the client device 106 indicating that one or more segments of the content represented by the entire file identified for download (or potential download) are likely to be of interest to the user 108, and giving the user 108 of the client device 106 the opportunity to download one or more files representing only the recommended segments.

At a step 508, the routine 500 determines whether a message received from the client device 106 in response to the recommendation message identifies some subset of the content segments for download. For example, the user 108 may have either accepted the recommendation as presented or may have selected one or more different content segments as being of interest. In some embodiments, for example, the client device 106 may display an indication of the various segments of content for the selected file, and possibly descriptive information about each of them, and the user 108 may provide an input to select one or more of the indicated segments, e.g., by clicking checkboxes or the like, corresponding to the respective segments that are desired for download.

If it is determined, at the step 508, that a subset of the segments is not desired, e.g., if the user elected to download the entire file, then the FSMS 102 may send the entire file to the client (step 510). If, on the other hand, it is determined, at the step 508, that a subset of the segments has been selected for download, then the FSMS 102 may generate one or more new files that include only the selected segments as payload(s) (step 512), and then send the new file(s) to the client device 106 (step 514). The new file(s) may also be stored in the storage medium 406 (as "segment files"), and metadata concerning such new files may be stored in the database 404 (as "segment file metadata") for future use.

Figure 6:
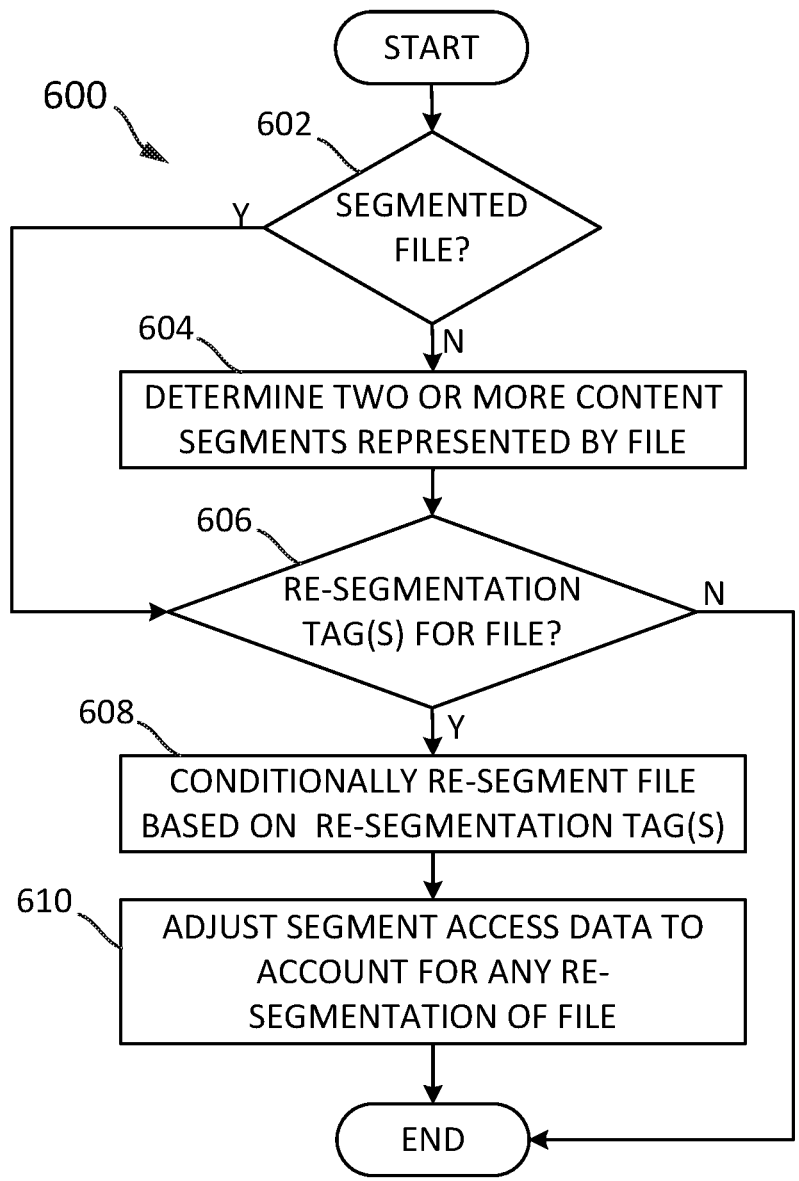
FIG. 6 shows an example routine that may be executed by the segmentation engine shown in FIG. 4.

FIG. 6 shows an example of a routine 600 that may be executed by the segmentation engine 410 shown in FIG. 4 and which may be called at the step 504 of the routine 500 shown in FIG. 5. As shown, a determination may be made, at a step 602, whether the file in question has already been segmented. If the file has not already been segmented, then the routine 600 may initially proceed to a step 604, at which two or more segments of content that are represented by the file may be determined, before continuing to a step 606. Examples of processes for making the determination of the step 604 are described above in connection with the step 114 shown in FIG. 1A and the steps 128, 130, and 132 shown in FIGS. 1B and 1C, and will thus not be described again here. If the file has not already been segmented, then the routine 600 may proceed directly to the step 606.

At the step 606, the routine 600 may check the database 404 to determine whether any re-segmentation tags are associated with the file. As explained in more detail below, in some embodiments, individuals accessing the file may selectively apply re-segmentation tags to portions of the file to indicate how they believe the file ought to be re-segmented. For instance, an individual may apply a "Product A" tag to a first segment of a video describing one product and a "Product B" tag to a second segment of a video describing another product. Such tagging may be achieved in any of a number of ways. In some embodiments, for example, an individual may right click on a location on a video scroll bar to obtain a drop down menu of tag suggestions and/or a blank to type in a new tag name, e.g., "Product A." That re-segmentation tag may then be associated with the specified location in the video.

At a step 608 of the routine 600, the segmentation engine 410 may adjust the content segments of the file based on the re-segmentation tags. In some embodiments, re-segmentation will be performed only under certain circumstances. For example, in some embodiments, a certain threshold number of re-segmentation tags of the same type may need to be received before re-segmenting a file. In other embodiments, re-segmentation tags applied by certain individuals, e.g., the author or a designated custodian of the file, may be given precedence over other tags, or approval of one or more particular individuals may be required before allowing re-segmentation of a file to take place in response to the application of re-segmentation tags by others. In still other embodiments, re-segmentation may be permitted in response to receipt of even a single re-segmentation tag by any individual that has permission to access the file. In some embodiments, when re-segmentation is performed (based on a re-segmentation tag, in response to input by an author or designated custodian of the file, or otherwise), a learning algorithm may be employed to improve the automated segmentation process performed at the step 604, such as by adjusting one or more features or parameters used by the step 132 discussed above in connection with FIGS. 1A-B.

At a step 610, segment access data (described in detail below) indicating how often and extensively the previously identified segments have been accessed may be adjusted, to the extent possible, in view of any re-segmentation that was performed.

Figure 7:
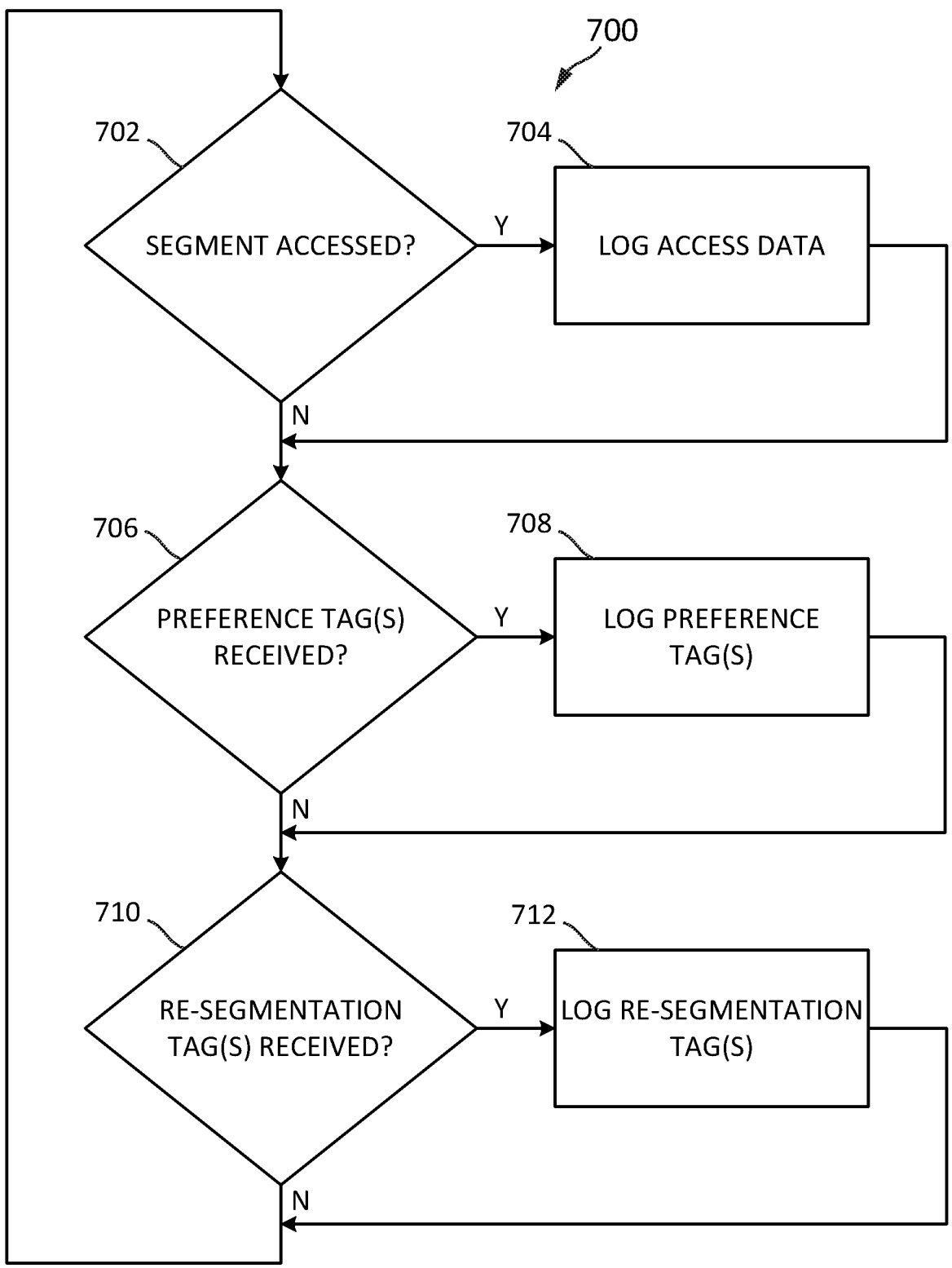
FIG. 7 shows an example routine that may be executed by the segment access and tag monitoring engine shown in FIG. 4.

FIG. 7 shows an example of a routine 700 that may be performed by the segment access and tag monitoring engine 412 shown in FIG. 4. In some embodiments, the routine 700 may continuously monitor interaction by client devices 106, 402 with one or more files stored by the storage medium 406. In some embodiments, the segment access and tag monitoring engine 412 may reside in the FSMS 102 and the routine 700 may monitor such interaction by evaluating communications between the client devices 106, 402 and the file access interface engine 408 shown in FIG. 4. In other embodiments, the functionality of the routine 700 may be distributed between the client devices 106, 402 and the FSMS 102. For example, one or more agents on the client devices 106, 402 may monitor user interaction with the respective files/segments and communicate accumulated usage data to the FSMS 102 for logging in the database 404.

As shown in FIG. 7, each time the routine 700 determines, at a step 702, that a particular segment of a file has been accessed, it may cause data corresponding to the access to be logged (step 704) in the database 404. In some embodiments, the segment access determined at the step 702 may correspond to an on-line access in which a client device 106, 402 is receiving streamed content (e.g., video or audio content) from a segment of a complete file stored in the storage medium 406. In other embodiments, instances in which a segment file stored in the storage medium 406 is downloaded to a client device 106, 402 may additionally or alternatively counted as accesses to that segment. In some embodiments, the FSMS 102 may also determine the current location of each user effecting any such access, e.g., based on the IP address of the client device 106, 402 accessing the file segment, and store data indicating such locations in the database 404 along with data indicating the quantity, and possibly also the cumulative duration, of accesses from each such location. In other embodiments, the FSMS 102 may additionally or alternatively retrieve profile information associated with the user of the client device 106, 402 effecting the access and store some or all of such profile information in the database 404 along with information indicating the number of accesses made to the segment, and possibly also the cumulative time duration, of such accesses. An example of how quantities and cumulative durations of accesses by individual having certain characteristics (e.g., location and job title) may be correlated in the database 404 is shown in FIG. 8. In the example shown, the access data indicates that individuals located in the United States and with the job title "engineer" accessed the "first segment" of "File XYZ" a total of "201" times and for a total duration of "65" minutes whereas individuals having those same characteristics accessed the second segment of "File XYZ" a total of "33" times and for a total duration of "15" minutes. Although not illustrated in FIG. 8, it should be appreciated that data for many other segments, and many other characteristics of individuals accessing such segments, may additionally or alternatively be collected and stored in the database 404.

Referring again to FIG. 7, each time the routine 700 determines, at a step 706, that a preference tag has been received from a client device 106, 402, it may cause data corresponding to the preference tag to be logged (step 708) in the database 404. Examples of preference tags are indicated as "TAG A" in the example data table of FIG. 8. In some embodiments, a preference tag may be as simple as a user indicating that a particular segment of content is "relevant" to his or her job function. Such a tag may be generated, for example, by a user selecting a button or other input mechanism while watching or listening to content from a particular segment. More sophisticated tags may, for example, assign different levels of relevance to discrete segments. For instance, in some embodiments, an individual may select "not relevant," "marginally relevant," or "highly-relevant" for a particular segment.

Referring still to FIG. 7, each time the routine 700 determines, at a step 710, that a re-segmentation tag has been received from a client device 106, 402, it may cause data corresponding to the segmentation tag to be logged (step 712) in the database 404. As noted above in connection with the description of steps 606 and 608 shown in FIG. 6, such re-segmentation tags may be correlated with the complete files stored in the storage medium 406 and may indicate, for instance, a location within the content (e.g., a time marker in a video) at which re-segmentation is desired as well as an indicator of the topic or subject matter of the desired new segment.

Figure 9A:
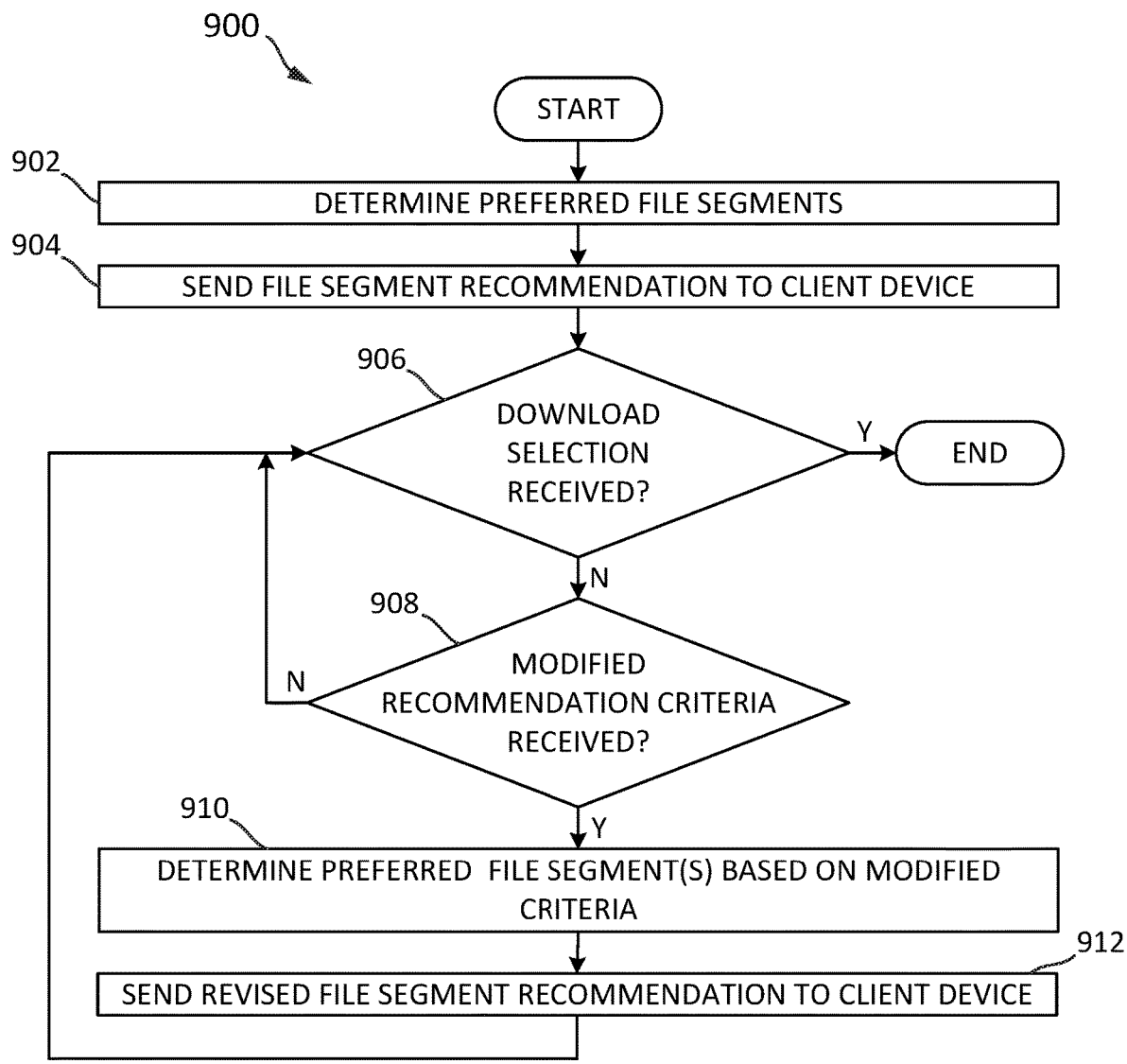
FIG. 9A shows an example routine that may be executed by the recommendation engine shown in FIG. 4.

FIG. 9A shows an example of a routine 900 that may be performed by the recommendation engine 414 shown in FIG. 4 and called at the step 506 shown in FIG. 5. As shown, the routine 900 may begin at a step 902, at which an algorithm (shown in FIG. 9B and described below) may be used to determine one or more of the segments of the content represented by a file requested for download that are likely to be of the most relevance to the user 108 of the client device 106 that requested the download. At a step 904, the FSMS 102 may send a message to the client device 106 indicating the recommended segments. The message sent at the step 904 may, for example, correspond to the message 122 shown in FIG. 1A.

Figure 9B:
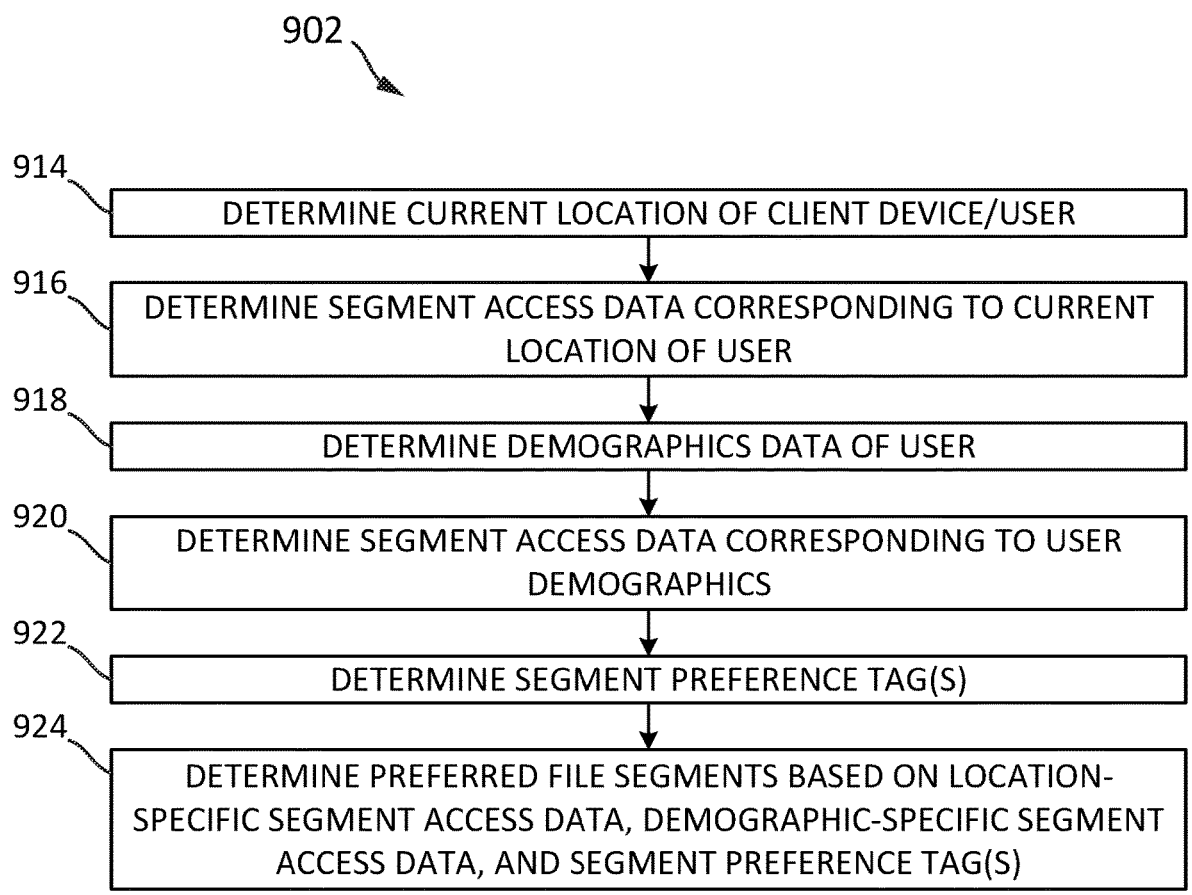
FIG. 9B shows an example implementation of a routine for determining one or more preferred file segments in accordance with one of the steps shown in FIG. 9A.

Referring now to FIG. 9B, an example of an algorithm that may be used at the step 902 of FIG. 9A will now be described, before returning to the description of FIG. 9A. As shown in FIG. 9B, at a step 914, the current location of the client device 106 operated by the user 108 may be determined. As noted above, current location of the client device 106 may be determined, for example, using the IP address of the client device. At a step 916, segment access data reflecting the quantity and/or cumulative duration of accesses to the respective segments of the content represented by the file from the current location may be determined, e.g., by referring to a table such as that shown in FIG. 8. At a step 918, demographics data of the user 108 of the client device 106 may be determined. Such demographics data may be determined, for example, based on user profile information associated with the client's log on credentials. At a step 920, segment access data reflecting the quantity and/or cumulative duration of accesses to the respective segments of the content represented by the file by individuals matching one or more characteristics of the user (e.g., job title) may be determined, for example, by also referring to a table such as that shown in FIG. 8. At a step 922, any segment preference tags that have been received from individuals for respective segments may also be determined. Finally, at a step 924, one or more segments that are likely to be of the most interest to the user 108 may be determined based on a combination of the location-specific segment access data, the demographic-specific segment access data, and/or any identified segment preference tags. Any of a number of algorithms and/or equations may be used to evaluate the foregoing data, possibly giving more weight to certain data or factors than other data or factors. In some embodiments, the data may also be filtered to at least some extent by considering only data that exceeds certain threshold values. Such algorithms and/or equations may, of course, also be tailored to the particular circumstances or purpose of the recommendation being given.

Returning now to FIG. 9A, after a file segment recommendation has been sent to the client device 106, the routine 900 may wait for a message from the client device that identifies for download either the complete file or one or more discrete segments (recommended or otherwise) of the content represented by the file. If such a message is received, then the routine 900 completes and the routine 500 shown in FIG. 5 may continue to the step 508. As shown in FIG. 9A, while waiting for a download selection message, the routine 900 may also determine, at a step 908, whether the FSMS 102 instead receives a message indicating one or more modified criteria on which a determination of likely relevance of the respective segments may be determined. For instance, the user 108 of the client device may, via a user interface, indicate whether each of current location, job title, etc., is to be taken into account when making the segment relevance determination. Additionally or alternatively, in some embodiments, the user 108 may also determine, via a user interface, the types and/or specificity of the data that is to be used for such a determination. For example, as illustrated in FIG. 10, in some embodiments, one or more expandable tree structures or similar mechanisms, may be used to indicate a hierarchical organization of locations, job titles, etc., and the user may selectively expand or collapse such elements and indicate the types and/or specificity of the data, e.g., using check boxes of the like, that is to be used. In the example shown in FIG. 10, for instance, the checked boxes may indicate that the user 108 wants relevance of the segments to be determined based on data corresponding only to individuals who are software engineers located in the United States. As another example, the user 108 may have the job title "electrical engineer," but may want to review segments relating to sales topics. In such a circumstance, the user 108 could select the check box for "sales" so as to cause the FSMS 102 to send a revised recommendation identifying one or more segments that are likely to be the most relevant to sales personnel.

As shown in FIG. 9A, if, at the step 908, it is determined that one or more modified recommendation criteria have been received from the client device 106, then one or more preferred file segments may again be determined using an algorithm that is the same as or similar to that shown in FIG. 9B, but taking into account the modified criteria. At a step 912, a new message indicating a revised recommendation of segments may then be sent to the client device 106, and the FSMS 102 may again await either a download selection indication (per the step 906) or further modified relevance criteria (per the step 908) from the client device 106.

Figure 11:
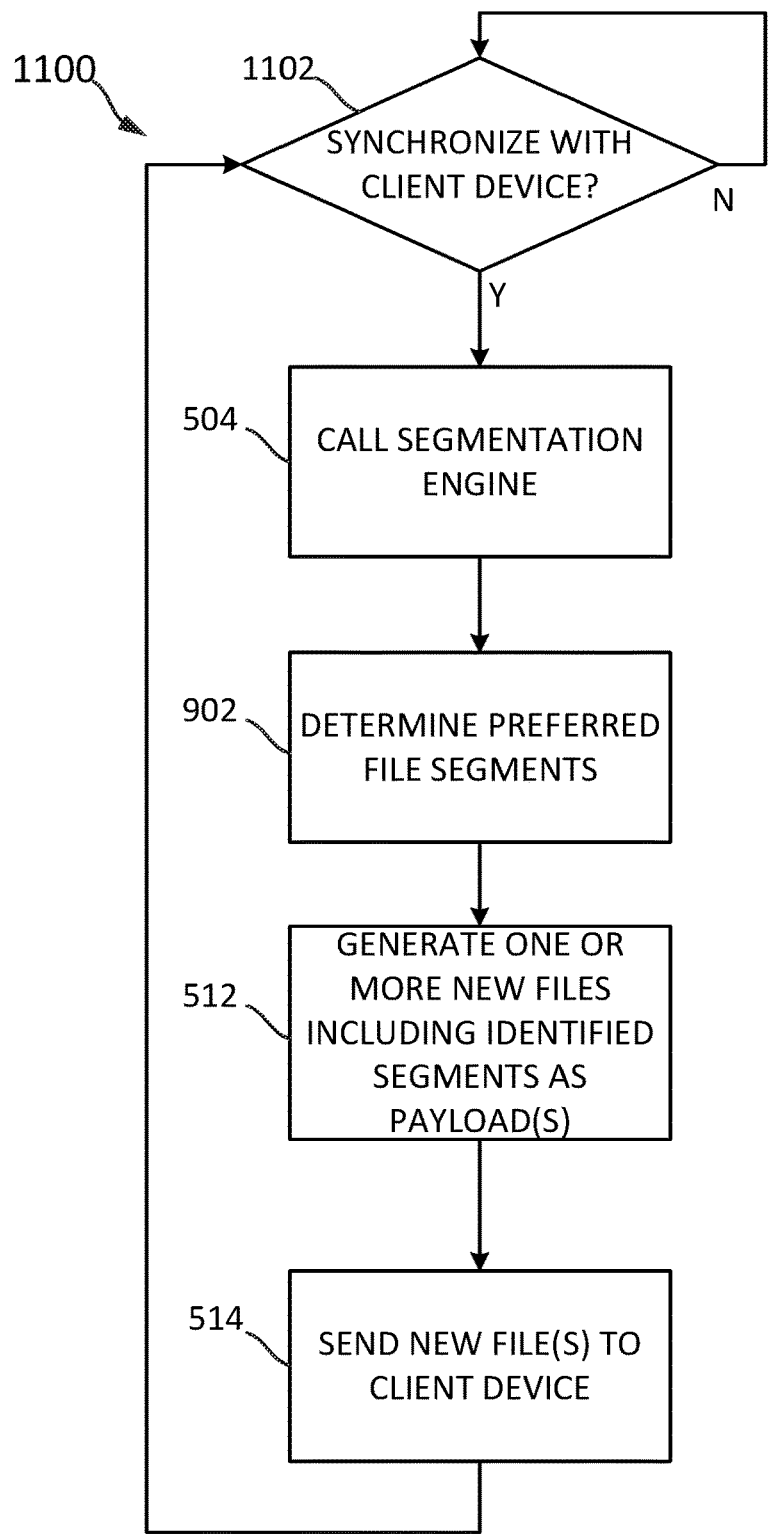
FIG. 11 shows an example routine that may be executed by the FSMS shown in FIG. 4 to transfer only selected portions of a file to with a client device during a synchronization operation.

FIG. 11 illustrates an example of a routine 1100 that may, for example, be performed by the file access interface engine 408 shown in FIG. 4 when the FSMS 102 is ready to perform a synchronization operation with the client device 106 (step 1102). The routine 1100 may be particularly beneficial, for example, in a circumstance in which the client device 106 has a limited storage capacity. By executing the routine 1100, the FSMS 102 may, for at least certain files, determine discrete segments of content represented by the files that are most likely to be relevant to the user 108 of the client device 106 and, rather than downloading the entirety of such files, download one or more files that represent only the determined discrete segments, thus maximizing the likelihood that the content transferred to the client device 106 during the synchronization operation is the content that will be the most useful to the user 108. Because the operations performed by the steps/routines 504, 902, 512, and 514 are described above, the description of those operations will not be repeated here.

Figure 12:
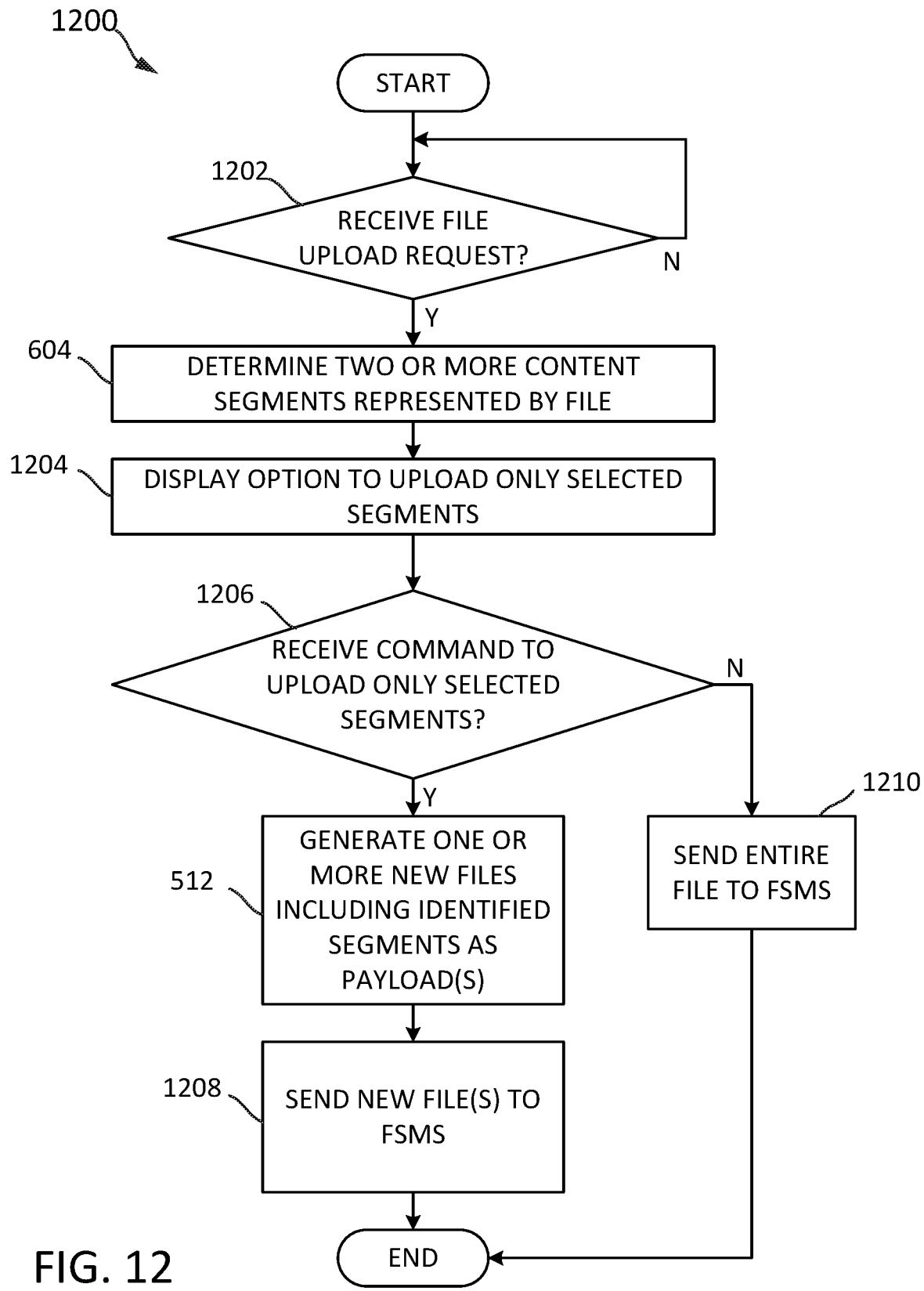
FIG. 12 shows an example routine that may be executed by a client device to identify and transfer selected portions of a file to the FSMS shown in FIG. 4.

FIG. 12 shows an example of a routine 1200 that may be executed by the client device 106 in connection with the uploading of a file to the FSMS 102. The routine 1200 may be particularly useful, for example, in a circumstance when the user 108 desires to upload less than the entirety of a large media file, e.g., an MP4 file, to a file storage system, such as the FSMS 102. As shown, at a step 1202, the routine 1200 may determine whether a request (in response to input from the user 108) to upload a file to the FSMS 102 has been received.

At the step 604 (described above in connection with FIG. 6), one or more payloads of the file may be decoded and analyzed (e.g., a transcript of the audio corresponding to an audio payload may be parsed) to determine two of more content segments represented by the file.

At a step 1204, the client device 106 may display an option to upload only selected ones of the determined segments of the content. If, at the step 1206, a command (in response to input from the user 108) is received indicating that at least one, but fewer than all, of the determined segments are to be uploaded, the routine 1200 may proceed to the step 512 (described above in connection with FIG. 5), at which one or new files may be generated that include the identified segments of content as payloads. At a step, 1208, the client device 106 may send the newly-generated file(s) (representing only the selected segments of the content) to the FSMS 102. If, at the step 1206, a command (in response to input from the user 108) is received that instead indicates that the entirety of the file is to be uploaded, then the routine 1200 may proceed to a step 1210, at which the entire file is sent to the FSMS 102.

E. Example Implementations of Methods, Systems, and Computer-Readable Media in Accordance with the Present Disclosure The following paragraphs (M1) through (M24) describe examples of methods that may be implemented in accordance with the present disclosure.

(M1) A method performed by at least one computing device may involve determining at least first and second segments of content represented by a first file, determining first data corresponding to occasions on which the first segment has been previously accessed, and determining second data corresponding to occasions on which the second segment has been previously accessed. Based at least in part on the first data and the second data, it may be determined that the first segment is likely more relevant to a first user than the second segment.

(M2) A method may be performed as described in paragraph (M1), and may further involve causing an indication to be output, via a user interface of a computing device operated by the first user, that the first segment is likely more relevant to the first user than the second segment.

(M3) A method may be performed as described in paragraph (M1) or paragraph (M2), wherein determining that the first segment is likely more relevant to the first user than the second segment may further involve determining that the first user has at least one characteristic, determining that other individuals having the at least one characteristic have accessed the first segment more than the second segment, and determining, based at least in part on the first user having the at least one characteristic and the other users with the at least one characteristic having accessed the first segment more than the second segment, that the first segment is likely more relevant to the first user than the second segment.

(M4) A method may be performed as described in paragraph (M3), wherein the at least one characteristic may comprise a location, and determining that the first user has the at least one characteristic may further involve determining a current location of the first user.

(M5) A method may be performed as described in paragraph (M3) or paragraph (M4), wherein the at least one characteristic may comprise a job title, and determining that the first user has the at least one characteristic may further involve determining a job title of the first user.

(M6) A method may be performed as described in any of paragraphs (M1) through (M5), wherein the at least one computing device comprises at least one server, and the method may further involve determining that at least a portion of the first file is to be sent to a client device operated by the first user, and sending, from the at least one server to the client device, a second file that represents the first segment but not the second segment.

(M7) A method may be performed as described in paragraph (M6), wherein determining that at least the portion of the first file is to be sent to the client device may further involve sending, from the at least one server to the client device, a first message that causes an indication to be output, via a user interface of the client device, that the first segment is likely more relevant to the first user than the second segment, and receiving, at the server and from the client device, a second message indicating that the first segment is to be represented in the second file.

(M8) A method may be performed as described in paragraph (M6), wherein determining that at least the portion of the first file is to be sent to the client device may further involve determining, by the at least one server, a need to synchronize first content on the at least one server with second content on the client device.

(M9) A method may be performed as described in any of paragraphs (M1) through (M8), and may further involve determining that at least one preference tag is associated with the first segment, wherein determining that the first segment is likely more relevant to the first user than the second segment may be further based at least in part on the at least one preference tag being associated with the first segment.

(M10) A method may be performed as described in paragraph (M9), wherein the at least one computing device may comprise at least one server, and the method may further involve receiving the at least one preference tag from a client device that is accessing the first segment.

(M11) A method may be performed as described in any of paragraphs (M1) through (M10), wherein determining the at least first and second segments of content represented by the first file may further involve decoding at least one first payload of the first file to determine at least first un-encoded data representing audio, determining first text corresponding to at least a portion of the audio, and determining, based at least in part on the first text, that the at least first and second segments of content are represented by the first file.

(M12) A method may be performed as described in any of paragraphs (M1) through (M11), and may further involve generating a second file including at least one media payload that represents the first segment but not the second segment.

(M13) A method may be performed as described in paragraph (M12), wherein the at least one computing device may comprise a client device, and the method may further involve sending the second file from the client device to at least one server.

(M14) A method may be performed as described in paragraph (M12), wherein the at least one computing device may comprise at least one server, and the method may further involve receiving, by the at least one server, a request for the second file from a client device, and sending the second file from the at least one server to the client device in response to the request.

(M15) A method may be performed as described in any of paragraphs (M1) through (M14), wherein the first file may be a media container file, and the first and second segments of content may include at least first and second segments of video content.

(M16) A method may be performed as described in paragraph (M15), wherein the first and second segments of content may further include at least first and second segments of audio content.

(M17) A method performed by at least one computing device may involve decoding at least one first payload of a first media file to determine at least first un-encoded data representing audio, and determining first text corresponding to at least a portion of the audio. Based at least in part on the first text, at least first and second segments of media content represented by the first media file may be determined, and a second media file including at least one second payload that represents the first segment but not the second segment may be generated.

(M18) A method may be performed as described in paragraph (M17), wherein the at least one computing device may comprise a client device, and the method may further involve sending the second media file from the client device to at least one server.

(M19) A method may be performed as described in paragraph (M17), wherein the at least one computing device may comprise at least one server, and the method may further involve receiving, by the at least one server, a request for the second media file from a client device, and sending the second media file from the at least one server to the client device in response to the request.

(M20) A method may be performed as described in any of paragraphs (M17) through (M19), wherein determining the first text may further involve performing automatic speech recognition processing on audio data representing the audio.

(M21) A method may be performed as described in any of paragraphs (M17) through (M20), wherein determining the first and second segments of media content may further involve determining the first segment based at least in part on identification of at least one first keyword in the text corresponding to a first topic, and determining the second segment based at least in part on identification of at least one second keyword in the text corresponding to a second topic.

(M22) A method may be performed as described in any of paragraphs (M17) through (M21), wherein determining the at least first and second segments of media content may further involve determining first and second portions of audio data represented by the first payload, determining a first portion of video data represented by a second payload, the first portion corresponding to the first portion of the audio data, and determining a second portion of video data represented by the second payload, the second portion corresponding to the second portion of the audio data, wherein the first segment of media content may correspond to the first portion of audio data and the first portion of video data, and the second segment of media content may correspond to the second portion of audio data and the second portion of video data.

(M23) A method may be performed as described in any of paragraphs (M17) through (M22), and may further involve determining that at least one re-segmentation tag is associated with a location within the first media content, wherein determining the at least first and second segments may be further based at least in part on the at least one re-segmentation tag being associated with the location.

(M24) A method may be performed as described in paragraph (M23), wherein the at least one computing device may comprise at least one server, and the method may further involve receiving the at least one re-segmentation tag from a client device that is accessing the first media content.

The following paragraphs (S1) through (S24) describe examples of systems that may be implemented in accordance with the present disclosure.

(S1) A system may include at least one processor and at least one computer-readable medium encoded with instructions which, when executed by the at least one processor, cause the system to determine at least first and second segments of content represented by a first file, to determine first data corresponding to occasions on which the first segment has been previously accessed, to determine second data corresponding to occasions on which the second segment has been previously accessed, and to determine, based at least in part on the first data and the second data, that the first segment is likely more relevant to a first user than the second segment.

(S2) A system may be configured as described in paragraph (S1), and the at least one computer-readable medium may be further encoded with additional instructions which, when executed by the at least one processor, further cause the system to cause an indication to be output, via a user interface of a computing device operated by the first user, that the first segment is likely more relevant to the first user than the second segment.

(S3) A system may be configured as described in paragraph (S1) or paragraph (S2), and the at least one computer-readable medium may be further encoded with additional instructions which, when executed by the at least one processor, further cause the system to determine that the first segment is likely more relevant to the first user than the second segment at least in part by determining that the first user has at least one characteristic, determining that other individuals having the at least one characteristic have accessed the first segment more than the second segment, and determining, based at least in part on the first user having the at least one characteristic and the other individuals with the at least one characteristic having accessed the first segment more than the second segment, that the first segment is likely more relevant to the first user than the second segment.

(S4) A system may be configured as described in paragraph (S3), wherein the at least one characteristic may comprise a location, and the at least one computer-readable medium may be further encoded with additional instructions which, when executed by the at least one processor, further cause the system to determine that the first user has the at least one characteristic at least in part by determining a current location of the first user.

(S5) A system may be configured as described in paragraph (S3) or paragraph (S4), wherein the at least one characteristic may comprise a job title, and the at least one computer-readable medium may be further encoded with additional instructions which, when executed by the at least one processor, further cause the system to determine that the first user has the at least one characteristic at least in part by determining a job title of the first user.

(S6) A system may be configured as described in any of paragraphs (S1) through (S5), wherein the at least one computer-readable medium may be further encoded with additional instructions which, when executed by the at least one processor, further cause the system to determine that at least a portion of the first file is to be sent to a client device operated by the first user, and to send, to the client device, a second file that represents the first segment but not the second segment.

(S7) A system may be configured as described in paragraph (S6), wherein the at least one computer-readable medium may be further encoded with additional instructions which, when executed by the at least one processor, further cause the system to determine that at least the portion of the first file is to be sent to the client device at least on part by sending, to the client device, a first message that causes an indication to be output, via a user interface of the client device, that the first segment is likely more relevant to the first user than the second segment, and receiving, from the client device, a second message indicating that the first segment is to be represented in the second file.

(S8) A system may be configured as described in paragraph (S6), wherein the at least one computer-readable medium may be further encoded with additional instructions which, when executed by the at least one processor, further cause the system to determine that at least the portion of the first file is to be sent to the client device at least in part by determining a need to synchronize first content stored by the system with second content on the client device.

(S9) A system may be configured as described in any of paragraphs (S1) through (S8), and the at least one computer-readable medium may be further encoded with additional instructions which, when executed by the at least one processor, further cause the system to determine that at least one preference tag is associated with the first segment, and to determine that the first segment is likely more relevant to the first user than the second segment based at least in part on the at least one preference tag being associated with the first segment.

(S10) A system may be configured as described in paragraph (S9), wherein the at least one computer-readable medium may be further encoded with additional instructions which, when executed by the at least one processor, further cause the system to receive the at least one preference tag from a client device that is accessing the first segment.

(S11) A system may be configured as described in any of paragraphs (S1) through (S10), wherein the at least one computer-readable medium may be further encoded with additional instructions which, when executed by the at least one processor, further cause the system to determine the at least first and second segments of content represented by the first file at least in part by decoding at least one first payload of the first file to determine at least first un-encoded data representing audio, determining first text corresponding to at least a portion of the audio, and determining, based at least in part on the first text, that the at least first and second segments of content are represented by the first file.

(S12) A system may be configured as described in any of paragraphs (S1) through (S11), and the at least one computer-readable medium may be further encoded with additional instructions which, when executed by the at least one processor, further cause the system to generate a second file including at least one media payload that represents the first segment but not the second segment.

(S13) A system may be configured as described in paragraph (S12), wherein the at least one computer-readable medium may be further encoded with additional instructions which, when executed by the at least one processor, further cause the system to send the second file to at least one server.

(S14) A system may be configured as described in paragraph (S12), wherein the at least one computer-readable medium may be further encoded with additional instructions which, when executed by the at least one processor, further cause the system to receive a request for the second file from a client device, and to send the second file to the client device in response to the request.

(S15) A system may be configured as described in any of paragraphs (S1) through (S14), wherein the first file may be a media container file, and the first and second segments of content may include at least first and second segments of video content.

(S16) A system may be configured as described in paragraph (S15), wherein the first and second segments of content may further include at least first and second segments of audio content.

(S17) A system may include at least one processor and at least one computer-readable medium encoded with instructions which, when executed by the at least one processor, cause the system to decode at least one first payload of a first media file to determine at least first un-encoded data representing audio, to determine first text corresponding to at least a portion of the audio, to determine based at least in part on the first text, at least first and second segments of media content represented by the first media file, and to generate a second media file including at least one second payload that represents the first segment but not the second segment.

(S18) A system may be configured as described in paragraph (S17), wherein the at least one computer-readable medium may be further encoded with additional instructions which, when executed by the at least one processor, further cause the system to send the second media file to at least one server.

(S19) A system may be configured as described in paragraph (S17), wherein the at least one computer-readable medium may be further encoded with additional instructions which, when executed by the at least one processor, further cause the system to receive a request for the second media file from a client device, and to send the second media file to the client device in response to the request.

(S20) A system may be configured as described in any of paragraphs (S17) through (S19), and the at least one computer-readable medium may be further encoded with additional instructions which, when executed by the at least one processor, further cause the system to determine the first text at least in part by performing automatic speech recognition processing on audio data representing the audio.

(S21) A system may be configured as described in any of paragraphs (S17) through (S20), and the at least one computer-readable medium may be further encoded with additional instructions which, when executed by the at least one processor, further cause the system to determine the first and second segments of media content at least in part by determining the first segment based at least in part on identification of at least one first keyword in the text corresponding to a first topic, and determining the second segment based at least in part on identification of at least one second keyword in the text corresponding to a second topic.

(S22) A system may be configured as described in any of paragraphs (S17) through (S21), and the at least one computer-readable medium may be further encoded with additional instructions which, when executed by the at least one processor, further cause the system to determine the at least first and second segments of media content at least in part by determining first and second portions of audio data represented by the first payload, determining a first portion of video data represented by a second payload, the first portion corresponding to the first portion of the audio data, and determining a second portion of video data represented by the second payload, the second portion corresponding to the second portion of the audio data, wherein the first segment of media content may correspond to the first portion of audio data and the first portion of video data, and the second segment of media content may correspond to the second portion of audio data and the second portion of video data.

(S23) A system may be configured as described in any of paragraphs (S17) through (S22), and the at least one computer-readable medium may be further encoded with additional instructions which, when executed by the at least one processor, further cause the system to determine that at least one re-segmentation tag is associated with a location within the first media content, and to determine the at least first and second segments further based at least in part on the at least one re-segmentation tag being associated with the location.

(S24) A system may be configured as described in paragraph (S23), wherein the at least one computer-readable medium may be further encoded with additional instructions which, when executed by the at least one processor, further cause the system to receive the at least one re-segmentation tag from a client device that is accessing the first media content.

The following paragraphs (CRM1) through (CRM24) describe examples of computer-readable media that may be implemented in accordance with the present disclosure.

(CRM1) At least one computer-readable medium may be encoded with instructions which, when executed by at least one processor, cause the at least one processor to determine at least first and second segments of content represented by a first file, to determine first data corresponding to occasions on which the first segment has been previously accessed, to determine second data corresponding to occasions on which the second segment has been previously accessed, and to determine, based at least in part on the first data and the second data, that the first segment is likely more relevant to a first user than the second segment.

(CRM2) At least one computer-readable medium may be encoded with instructions as described in paragraph (CRM1), and may be further encoded with additional instructions which, when executed by the at least one processor, further cause the at least one processor to cause an indication to be output, via a user interface of a computing device operated by the first user, that the first segment is likely more relevant to the first user than the second segment.

(CRM3) At least one computer-readable medium may be encoded with instructions as described in paragraph (CRM1) or paragraph (CRM2), and may be further encoded with additional instructions which, when executed by the at least one processor, further cause the at least one processor to determine that the first segment is likely more relevant to the first user than the second segment at least in part by determining that the first user has at least one characteristic, determining that other individuals having the at least one characteristic have accessed the first segment more than the second segment, and determining, based at least in part on the first user having the at least one characteristic and the other individuals with the at least one characteristic having accessed the first segment more than the second segment, that the first segment is likely more relevant to the first user than the second segment.

(CRM4) At least one computer-readable medium may be encoded with instructions as described in paragraph (CRM3), wherein the at least one characteristic may comprise a location, and wherein the at least one computer-readable medium may be further encoded with additional instructions which, when executed by the at least one processor, further cause the at least one processor to determine that the first user has the at least one characteristic at least in part by determining a current location of the first user.

(CRM5) At least one computer-readable medium may be encoded with instructions as described in paragraph (CRM3) or paragraph (CRM4), wherein the at least one characteristic may comprise a job title, and wherein the at least one computer-readable medium may be further encoded with additional instructions which, when executed by the at least one processor, further cause the at least one processor to determine that the first user has the at least one characteristic at least in part by determining a job title of the first user.

(CRM6) At least one computer-readable medium may be encoded with instructions as described in any of paragraphs (CRM1) through (CRM5), wherein the at least one computer-readable medium may be further encoded with additional instructions which, when executed by the at least one processor, further cause at least one server to determine that at least a portion of the first file is to be sent to a client device operated by the first user, and to send, to the client device, a second file that represents the first segment but not the second segment.

(CRM7) At least one computer-readable medium may be encoded with instructions as described in paragraph (CRM6), and may be further encoded with additional instructions which, when executed by the at least one processor, further cause the at least one server to determine that at least the portion of the first file is to be sent to the client device at least on part by sending, to the client device, a first message that causes an indication to be output, via a user interface of the client device, that the first segment is likely more relevant to the first user than the second segment, and receiving, from the client device, a second message indicating that the first segment is to be represented in the second file.

(CRM8) At least one computer-readable medium may be encoded with instructions as described in paragraph (CRM6), and may be further encoded with additional instructions which, when executed by the at least one processor, further cause the at least one server to determine that at least the portion of the first file is to be sent to the client device at least in part by determining a need to synchronize first content stored by the at least one server with second content on the client device.

(CRM9) At least one computer-readable medium may be encoded with instructions as described in any of paragraphs (CRM1) through (CRM8), and may be further encoded with additional instructions which, when executed by the at least one processor, further cause the at least one processor to determine that at least one preference tag is associated with the first segment, and to determine that the first segment is likely more relevant to the first user than the second segment based at least in part on the at least one preference tag being associated with the first segment.

(CRM10) At least one computer-readable medium may be encoded with instructions as described in paragraph (CRM9), wherein the at least one computer-readable medium may be further encoded with additional instructions which, when executed by the at least one processor, further cause the at least one processor to receive the at least one preference tag from a client device that is accessing the first segment.

(CRM11) At least one computer-readable medium may be encoded with instructions as described in any of paragraphs (CRM1) through (CRM10), and may be further encoded with additional instructions which, when executed by the at least one processor, further cause the at least one processor to determine the at least first and second segments of content represented by the first file at least in part by decoding at least one first payload of the first file to determine at least first un-encoded data representing audio, determining first text corresponding to at least a portion of the audio, and determining, based at least in part on the first text, that the at least first and second segments of content are represented by the first file.

(CRM12) At least one computer-readable medium may be encoded with instructions as described in any of paragraphs (CRM1) through (CRM11), and may be further encoded with additional instructions which, when executed by the at least one processor, further cause the at least one processor to generate a second file including at least one media payload that represents the first segment but not the second segment.

(CRM13) At least one computer-readable medium may be encoded with instructions as described in paragraph (CRM12), wherein the at least one computer-readable medium may be further encoded with additional instructions which, when executed by the at least one processor, further cause a client device to send the second file to at least one server.

(CRM14) At least one computer-readable medium may be encoded with instructions as described in paragraph (CRM12), wherein the at least one computer-readable medium may be further encoded with additional instructions which, when executed by the at least one processor, further cause at least one server to receive a request for the second file from a client device, and to send the second file from the at least one server to the client device in response to the request.

(CRM15) At least one computer-readable medium may be encoded with instructions as described in any of paragraphs (CRM1) through (CRM14), wherein the first file may be a media container file, and the first and second segments of content may include at least first and second segments of video content.

(CRM16) At least one computer-readable medium may be encoded with instructions as described in paragraph (CRM15), wherein the first and second segments of content may further include at least first and second segments of audio content.

(CRM17) At least one computer-readable medium may be encoded with instructions which, when executed by at least one processor, cause the at least one processor to decode at least one first payload of a first media file to determine at least first un-encoded data representing audio, to determine first text corresponding to at least a portion of the audio, to determine based at least in part on the first text, at least first and second segments of media content represented by the first media file, and to generate a second media file including at least one second payload that represents the first segment but not the second segment.

(CRM18) At least one computer-readable medium may be encoded with instructions as described in paragraph (CRM17), wherein the at least one computer-readable medium may be further encoded with additional instructions which, when executed by the at least one processor, further cause a client device to send the second media file to at least one server.

(CRM19) At least one computer-readable medium may be encoded with instructions as described in paragraph (CRM17), wherein the at least one computer-readable medium may be further encoded with additional instructions which, when executed by the at least one processor, further cause at least one server to receive a request for the second media file from a client device, and to send the second media file to the client device in response to the request.

(CRM20) At least one computer-readable medium may be encoded with instructions as described in any of paragraphs (CRM17) through (CRM19), and may be further encoded with additional instructions which, when executed by the at least one processor, further cause the at least one processor to determine the first text at least in part by performing automatic speech recognition processing on audio data representing the audio.

(CRM21) At least one computer-readable medium may be encoded with instructions as described in any of paragraphs (CRM17) through (CRM20), and may be further encoded with additional instructions which, when executed by the at least one processor, further cause the at least one processor to determine the first and second segments of media content at least in part by determining the first segment based at least in part on identification of at least one first keyword in the text corresponding to a first topic, and determining the second segment based at least in part on identification of at least one second keyword in the text corresponding to a second topic.

(CRM22) At least one computer-readable medium may be encoded with instructions as described in any of paragraphs (CRM17) through (CRM21), and may be further encoded with additional instructions which, when executed by the at least one processor, further cause the at least one processor to determine the at least first and second segments of media content at least in part by determining first and second portions of audio data represented by the first payload, determining a first portion of video data represented by a second payload, the first portion corresponding to the first portion of the audio data, and determining a second portion of video data represented by the second payload, the second portion corresponding to the second portion of the audio data, wherein the first segment of media content may correspond to the first portion of audio data and the first portion of video data, and the second segment of media content may correspond to the second portion of audio data and the second portion of video data.

(CRM23) At least one computer-readable medium may be encoded with instructions as described in any of paragraphs (CRM17) through (CRM22), and may be further encoded with additional instructions which, when executed by the at least one processor, further cause the at least one processor to determine that at least one re-segmentation tag is associated with a location within the first media content, and to determine the at least first and second segments further based at least in part on the at least one re-segmentation tag being associated with the location.

(CRM24) At least one computer-readable medium may be encoded with instructions as described in paragraph (CRM23), wherein the at least one computer-readable medium may be further encoded with additional instructions which, when executed by the at least one processor, further cause at least one server to receive the at least one re-segmentation tag from a client device that is accessing the first media content.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by at least one computing device, comprising:
   determining that a first file includes at least a first portion representing a first segment of content and a second portion representing a second segment of content;
   determining first data corresponding to occasions on which the first portion of the first file has been previously accessed;
   determining second data corresponding to occasions on which the second portion of the first file has been previously accessed; and
   determining, based at least in part on the first data and the second data, that the first segment represented by the first portion of the first file is likely more relevant to a first user than the second segment represented by the second portion of the first file.

2. The method of claim 1, further comprising:
   causing an indication to be output, via a user interface of a computing device operated by the first user, that the first segment represented by the first portion of the first file is likely more relevant to the first user than the second segment represented by the second portion of the first file.

3. The method of claim 1, wherein determining that the first segment represented by the first portion of the first file is likely more relevant to the first user than the second segment represented by the second portion of the first file further comprises:
   determining that the first user has at least one characteristic;
   determining that other individuals having the at least one characteristic have accessed the first portion of the first file more than the second portion of the first file; and
   determining, based at least in part on the first user having the at least one characteristic and the other individuals with the at least one characteristic having accessed the first portion of the first file more than the second portion of the first file, that the first segment represented by the first portion of the first file is likely more relevant to the first user than the second segment represented by the second portion of the first file.

4. The method of claim 1, wherein the at least one computing device comprises at least one server, and the method further comprises:
   determining that at least a portion of the first file is to be sent to a client device operated by the first user; and
   sending, from the at least one server to the client device, a second file including the first portion representing the first segment but not including the second portion representing the second segment.

5. The method of claim 4, wherein determining that at least the portion of the first file is to be sent to the client device further comprises:
   sending, from the at least one server to the client device, a first message that causes an indication to be output, via a user interface of the client device, that the first segment represented by the first portion of the first file is likely more relevant to the first user than the second segment represented by the second portion of the first file; and receiving, at the at least one server and from the client device, a second message indicating that the first segment is to be represented in the second file.

6. The method of claim 4, wherein determining that at least the portion of the first file is to be sent to the client device further comprises:
  determining, by the at least one server, a need to synchronize first content on the at least one server with second content on the client device.

7. The method of claim 1, further comprising:
  determining that at least one preference tag is associated with the first segment represented by the first portion of the first file;
  wherein determining that the first segment represented by the first portion of the first file is likely more relevant to the first user than the second segment represented by the second portion of the first file is further based at least in part on the at least one preference tag being associated with the first segment represented by the first portion of the first file.

8. The method of claim 1, wherein:
  the first file is a media container file;
  the first portion of the first file represents a first segment of video content; and
  the second portion of the first file represents a second segment of video content.

9. A system, comprising:
  at least one processor; and
  at least one computer-readable medium encoded with instructions which, when executed by the at least one processor, cause the system to:
    determine that a first file includes at least a first portion representing a first segment of content and a second portion representing a second segment of content;
    determine first data corresponding to occasions on which the first portion of the first file has been previously accessed;
    determine second data corresponding to occasions on which the second portion of the first file has been previously accessed; and
    determine, based at least in part on the first data and the second data, that the first segment represented by the first portion of the first file is likely more relevant to a first user than the second segment represented by the second portion of the first file.

10. The system of claim 9, wherein the at least one computer-readable medium is encoded with additional instructions which, when executed by the at least one processor, further cause the system to:
  cause an indication to be output, via a user interface of a computing device operated by the first user, that the first segment represented by the first portion of the first file is likely more relevant to the first user than the second segment represented by the second portion of the first file.

11. The system of claim 9, wherein the at least one computer-readable medium is encoded with additional instructions which, when executed by the at least one processor, further cause the system to determine that the first segment represented by the first portion of the first file is likely more relevant to the first user than the second segment represented by the second portion of the first file at least in part by:
  determining that the first user has at least one characteristic;
  determining that other individuals having the at least one characteristic have accessed the first portion of the first file more than the second portion of the first file; and
  determining, based at least in part on the first user having the at least one characteristic and the other individuals with the at least one characteristic having accessed the first portion of the first file more than the second portion of the first file, that the first segment represented by the first portion of the first file is likely more relevant to the first user than the second segment represented by the second portion of the first file.

12. The system of claim 9, wherein the at least one computer-readable medium is encoded with additional instructions which, when executed by the at least one processor, further cause the system to:
  determine that at least a portion of the first file is to be sent to a client device operated by the first user; and
  send, to the client device, a second file including the first portion representing the first segment but not including the second portion representing the second segment.

13. The system of claim 12, wherein the at least one computer-readable medium is encoded with additional instructions which, when executed by the at least one processor, further cause the system to determine that at least the portion of the first file is to be sent to the client device at least in part by:
  sending, to the client device, a first message that causes an indication to be output, via a user interface of the client device, that the first segment represented by the first portion of the first file is likely more relevant to the first user than the second segment represented by the second portion of the first file; and
  receiving, from the client device, a second message indicating that the first segment is to be represented in the second file.

14. The system of claim 12, wherein the at least one computer-readable medium is encoded with additional instructions which, when executed by the at least one processor, further cause the system to determine that at least the portion of the first file is to be sent to the client device at least in part by determining a need to synchronize first content stored by the system with second content on the client device.

15. The system of claim 9, wherein the at least one computer-readable medium is encoded with additional instructions which, when executed by the at least one processor, further cause the system to:
  determine that at least one preference tag is associated with the first segment represented by the first portion of the first file; and
  determine that the first segment represented by the first portion of the first file is likely more relevant to the first user than the second segment represented by the second portion of the first file based at least in part on the at least one preference tag being associated with the first segment represented by the first portion of the first file.

16. The method of claim 1, wherein the first file comprises a first media file representing media content, and determining that the first file includes at least the first portion representing the first segment of content and the second portion representing the second segment of content further comprises:
  decoding at least one first payload of the first media file to determine at least first un-encoded data representing audio;
  determining first text corresponding to at least a portion of the audio; and determining, based at least in part on the first text, that the first file includes at least the first portion representing the first segment of content and the second portion representing the second segment of content.

17. The method of claim 16, wherein determining the first text comprises performing automatic speech recognition processing on audio data representing the audio.

18. The method of claim 17, wherein determining that the first file includes at least the first portion representing the first segment of content and the second portion representing the second segment of content further comprises:
   determining the first portion of the first file based at least in part on identification of at least one first keyword in the first text corresponding to a first topic; and
   determining the second portion of the first file based at least in part on identification of at least one second keyword in the first text corresponding to a second topic.

19. The method of claim 16, wherein determining that the first file includes at least the first portion representing the first segment of content and the second portion representing the second segment of content further comprises:
   determining first and second portions of audio data represented by the at least one first payload;
   determining a first portion of video data represented by a second payload, the first portion corresponding to the first portion of the audio data; and
   determining a second portion of video data represented by the second payload, the second portion corresponding to the second portion of the audio data;
   wherein the first portion of the first file corresponds to the first portion of audio data and the first portion of video data, and the second portion of the first file corresponds to the second portion of audio data and the second portion of video data.

20. The method of claim 16, further comprising:
   determining that at least one re-segmentation tag is associated with a location within the first media content;
   wherein determining that the first file includes at least the first portion representing the first segment of content and the second portion representing the second segment of content is further based at least in part on the at least one re-segmentation tag being associated with the location.

21. The method of claim 1, wherein the method is performed by a computing system at which the first file is stored, and further comprises:
   receiving, by the computing system and from a client device operated by the first user, a request identifying the first file; and
   sending, from the computing system to the client device, a message indicating that the first segment represented by the first portion of the first file has been determined to likely be more relevant to the first user than the second segment represented by the second portion of the first file.

22. The system of claim 9, wherein the at least one computer-readable medium is encoded with additional instructions which, when executed by the at least one processor, further cause the system to:
   receive, by the system and from a client device operated by the first user, a request identifying the first file; and
   sending, from the system to the client device, a message indicating that the first segment represented by the first portion of the first file has been determined to likely be more relevant to the first user than the second segment represented by the second portion of the first file.

* * * * *